(12) United States Patent
Banginwar et al.

(10) Patent No.: US 11,467,982 B2
(45) Date of Patent: Oct. 11, 2022

(54) VIRTUALIZATION-BASED PLATFORM PROTECTION TECHNOLOGY

(71) Applicant: Intel Corporation, Santa Clara, CA (US)

(72) Inventors: Rajesh P. Banginwar, Bangalore (IN); Sumanth Naropanth, Bangalore (IN); Sunil K. Notalapati Prabhakara, Bangalore (IN); Surendra K. Singh, Bangalore (IN); Arvind Mohan, Bangalore (IN); Ravi L. Sahita, Portland, OR (US); Rahil Malhotra, Bangalore (IN); Aman Bakshi, Bangalore (IN); Vasudevarao Kamma, Bangalore (IN); Jyothi Nayak, Bangalore (IN); Vivek Thakkar, Bangalore (IN); Royston A. Pinto, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 0 days.

(21) Appl. No.: 16/985,898

(22) Filed: Aug. 5, 2020

(65) Prior Publication Data

US 2020/0364158 A1 Nov. 19, 2020

Related U.S. Application Data

(60) Division of application No. 15/839,331, filed on Dec. 12, 2017, now Pat. No. 10,754,794, which is a (Continued)

(51) Int. Cl.
*G06F 12/14* (2006.01)
*G06F 9/48* (2006.01)
(Continued)

(52) U.S. Cl.
CPC ........ *G06F 12/145* (2013.01); *G06F 9/45545* (2013.01); *G06F 9/45558* (2013.01);
(Continued)

(58) Field of Classification Search
CPC .... G06F 12/023; G06F 12/109; G06F 12/145; G06F 12/1491; G06F 2009/45583;
(Continued)

(56) References Cited

U.S. PATENT DOCUMENTS 6,199,181 B1 3/2001 Rechef
8,090,919 B2 1/2012 Ravi
(Continued)

FOREIGN PATENT DOCUMENTS

CN 1581073 A 2/2005
CN 1797345 A 7/2006
(Continued)

OTHER PUBLICATIONS

Extended European Search Report for European Application No. 16812103.6, dated Jan. 23, 2019, 13 pages.
(Continued)

*Primary Examiner* — Yong J Choe
(74) *Attorney, Agent, or Firm* — Jaffery Watson Mendonsa & Hamilton LLP

(57) ABSTRACT

A data processing system (DPS) uses platform protection technology (PPT) to protect some or all of the code and data belonging to certain software modules. The PPT may include a virtual machine monitor (VMM) to enable an untrusted application and a trusted application to run on top of a single operating system (OS), while preventing the untrusted application from accessing memory used by the trusted application. The VMM may use a first extended page table (EPT) to translate a guest physical address (GPA) into a first host physical address (HPA) for the untrusted appli-
(Continued)

cation. The VMM may use a second EPT to translate the GPA into a second HPA for the trusted application. The first and second EPTs may map the same GPA to different HPAs. Other embodiments are described and claimed.

15 Claims, 18 Drawing Sheets

Related U.S. Application Data continuation of application No. 14/739,560, filed on Jun. 15, 2015, now Pat. No. 9,842,065.

(51) Int. Cl.
*G06F 21/53* (2013.01)
*G06F 9/455* (2018.01)
*G06F 21/57* (2013.01)
*G06F 12/109* (2016.01)
*G06F 12/02* (2006.01)

(52) U.S. Cl.
CPC ............ *G06F 9/485* (2013.01); *G06F 12/109* (2013.01); *G06F 12/1491* (2013.01); *G06F 21/53* (2013.01); *G06F 21/57* (2013.01); *G06F 12/023* (2013.01); *G06F 2009/45583* (2013.01); *G06F 2009/45587* (2013.01); *G06F 2212/1052* (2013.01); *G06F 2212/151* (2013.01); *G06F 2212/651* (2013.01); *G06F 2221/2149* (2013.01)

(58) Field of Classification Search
CPC ........... G06F 2009/45587; G06F 21/53; G06F 21/57; G06F 2212/1052; G06F 2212/151; G06F 2212/651; G06F 2221/2149; G06F 9/45545; G06F 9/45558; G06F 9/485
See application file for complete search history.

(56) References Cited

U.S. PATENT DOCUMENTS

| | | |
|---|---|---|
| 2008/0244155 A1 | 10/2008 | Kyungwoo et al. |
| 2008/0301398 A1 | 12/2008 | Falik et al. |
| 2009/0172330 A1 | 7/2009 | Dewan |
| 2013/0117804 A1 | 5/2013 | Chawla |
| 2014/0245430 A1 | 8/2014 | Harshawardhan et al. |
| 2014/0298334 A1 | 10/2014 | Munetoh |

FOREIGN PATENT DOCUMENTS

| | | |
|---|---|---|
| CN | 103778389 A | 5/2014 |
| CN | 103996004 A | 8/2014 |
| CN | 107667350 A | 2/2018 |
| CN | 114185648 | 3/2022 |
| EP | 3308317 A1 | 4/2018 |
| EP | 3825851 A | 5/2021 |
| WO | 2016204892 A1 | 12/2016 |

OTHER PUBLICATIONS

Yueqiang Cheng, et al., "Efficient Virtualization-Based Application Protection Against Untrusted Operating System", Proceedings of the 10th ACM Symposium on Information, Computer and Communications Security, ASIA CCs' 15, Jan. 1, 2015, pp. 345-356.
Owen S. Hofmann, et al., "InkTag", Architectural Support for Programming Languages and Operating Systems, ACM, 2 Pinn Plaza, Suite 701, New York, NY 10121-070L USA, Mar. 16, 2013, pp. 265-278.
Stephen Crane, et al., "Readactor: Practical Code Radomization Resilient to Memory Disclosurer", 2015 IEEE Symposium on Security and Privacy, May 1, 2015, pp. 763-780.
PCT International Search Report for PCT Application No. PCT/2016/032282, dated Aug. 16, 2016, 11 pages.
European Search Report for European Application No. 20217437.1, dated Apr. 26, 2021, 11 pages.
First OA in Chinese Application 201680028447.7, dated Apr. 20, 2021, 20 pages.

11,467,982 B2

VIRTUALIZATION-BASED PLATFORM PROTECTION TECHNOLOGY

CROSS-REFERENCE TO RELATED APPLICATION

The present application is a divisional application of U.S. patent application Ser. No. 15/839,331, entitled "Virtualization-based Platform Protection Technology," which was filed on Dec. 12, 2017 and which is a continuation of U.S. patent application Ser. No. 14/739,560, entitled "Virtualization-based Platform Protection Technology," which was filed Jun. 15, 2015.

TECHNICAL FIELD

Embodiments described herein relate generally to data processing and in particular to platform security.

BACKGROUND

In a conventional data processing system, an application may use a so-called "logical address" to access memory. The operating system (OS) may translate that logical address into a linear address. For instance, a running process may use logical addresses, and when instructions in that process request access to memory, the OS may use descriptor tables to translate the logical addresses into linear addresses. A linear address may also be referred to as a virtual address.

Furthermore, the data processing system may include a central processing unit (CPU) with a memory management unit (MMU), and the OS may use that MMU to translate virtual addresses into physical addresses. For instance, the MMU may provide for a page directory for each active process, and one or more page tables for each page directory. In particular, the page tables may include a page table entry (PTE) for each page of virtual memory, to identify the corresponding physical page. In general, the MMU may store the page directory and the page tables in random access memory (RAM), but the MMU may use a translation lookaside buffer (TLB) to cache recently used PTEs. The MMU may also use other hardware resources (e.g., descriptor tables) to service memory access requests. For example, a control register (CR) in the CPU (e.g., CR3) may point to the physical address of the page directory for the current process. When the data processing system allows the OS to access the MMU directly, the page tables referenced above may be referred to as OS page tables.

Unfortunately, an OS may be infected with malware. And if the OS has access to all of the data stored in memory, the OS may wreak all kinds of havoc with the system. For instance, in a rooted kernel, the attacker can compromise the security of the system by modifying the entries in the page table, for instance changing a PTE to point to some malicious code. This kind of change can lead to code injection, and the malware can thereby gain access to critical data.

DESCRIPTION OF EMBODIMENTS

Figure 1:
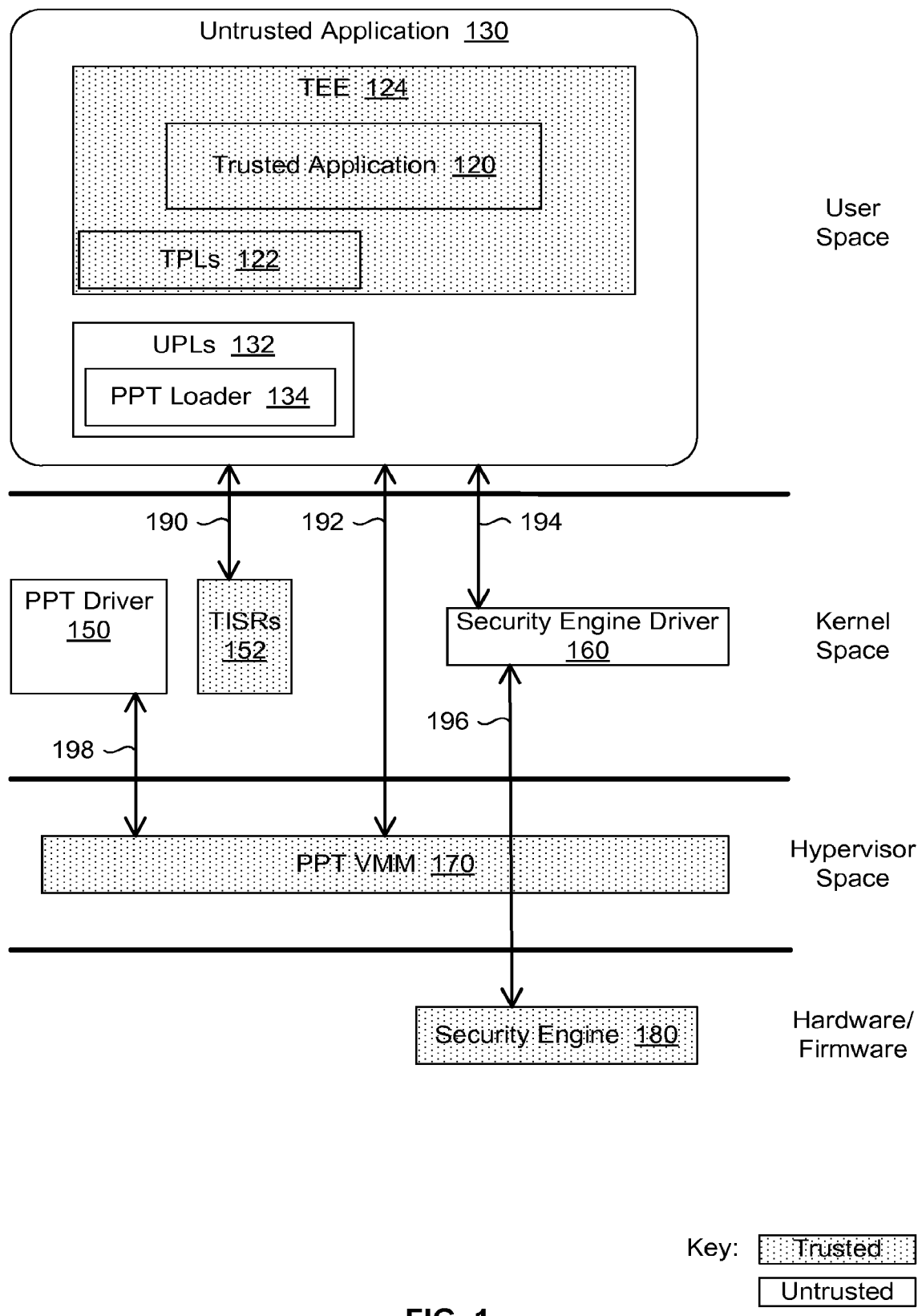
FIG. 1 is a block diagram illustrating some components and communication flows for an example embodiment of platform protection technology (PPT) architecture.

For purposes of illustration, the present disclosure describes one or more example embodiments. However, the present teachings are not limited to those particular embodiments.

This detailed description includes the following six parts:
Part 1: Trusted Views;
Part 2: Asserted Page Tables;
Part 3: Virtual Interrupt Descriptor Tables;
Part 4: Secure Cookie Values;
Part 5: Exception Handling Mechanism; and
Part 6: Conclusion.
Those parts are presented below, after the following introductory material.

For a data processing system that supports virtualization, an OS may run in a virtual machine (VM) on top of a virtual machine manager (VMM). An OS that runs in a VM may be referred to as a guest OS, and the underlying VMM may be referred to as the host OS. Different VMMs may use different techniques to prevent the guest OS from having unlimited access to memory. Those techniques may involve a page table managed by the guest to map a guest virtual address (GVA) to a guest physical address. That page table may be referred to as an OS page table or a guest page table. The VMM may then translate the guest physical address (GPA) to a host physical address (HPA).

According to one technique for limiting guest access to memory, a host OS uses a so-called "shadow page table" (SPT) to prevent the guest from changing the PTEs used for address translation. With this technique, the guest maintains one copy of the guest page table (GPT), and the host maintains a second copy of the GPT in a memory region that is hidden from the guest. The second copy is referred to as a shadow page table (SPT). In addition, the host uses the MMU to maintain a page table for translating from GPAs to HPAs. The page table that is managed by the VMM through use of the MMU hardware may also be referred to as hardware page table. The host maintains the SPT by trapping each page fault when the guest tries to access memory. In response to the page fault, the host updates the SPT entry for that page. Subsequently, during address translation, the host uses this SPT instead of the GPT. And since the SPT is maintained in an isolated memory region, it cannot be modified even in an attack from a rooted kernel. Thus, the host may use the SPT to prevent the guest OS from accessing certain physical pages, for example. However, this approach increases the cost of memory access since two address translations need to be performed for each memory access: one by the guest OS, using the shadow page table, and then another by the VMM, using the hardware page table. Also, the cost of trapping each page fault by the VMM to update the SPT may adversely affect system performance.

Conventional trusted execution environment (TEE) solutions may be resource constrained in one or more of the following ways: (1) They may require a trusted application (TA) in a TEE to be hosted in a separate OS or a real time OS (RTOS). (2) They may require special hardware support or micro-code extensions in order to facilitate the trusted execution. The technology described by ARM Ltd. under the name or trademark TRUSTZONE has the former requirement, and it requires a special hardware mode. Technology like that described by Intel Corporation under the name or trademark INTEL® SOFTWARE GUARD EXTENSIONS (SGX) may utilize micro-code extensions to support a TEE.

This disclosure introduces a protection model that supports features which may include, without limitation, dynamic memory allocation in the TEE. Some or all of the components which implement this protection model operate below the level of a guest OS. In other words, some or all of the components operate at the platform level. Accordingly, for purposes of this disclosure, the technology introduced herein may be referred to as Platform Protection Technology (PPT). As described in greater detail below, one of the benefits of PPT is the ability to protect some or all of the code and data belonging to certain software modules from user-level (e.g., ring-3) malware and from kernel-level (e.g., ring-0) malware. PPT may provide isolation between various trusted entities, along with the ability to allocate, free, and reuse the memory dynamically at runtime. In addition, the PPT memory sharing model may allow memory sharing between TAs and the untrusted OS, in addition to between TAs.

Also, PPT may be managed by the hypervisor, and the guest OS may not have access to shared memory unless explicitly permitted by the hypervisor. Also, PPT may provide for shared memory without copying the data being shared. In addition, a TA can send a request to a PPT hypervisor to determine whether that TA has exclusive or shared rights on a particular memory buffer. PPT may also provide for memory cleanup after the crash or exit of a TA and/or after the crash or exit of the process that created the TA.

PPT may utilize second level address translation (SLAT). For instance, in one embodiment, a data processing system uses extended page table (EPT) technology to implement SLAT. Using EPTs may be more efficient than using SPTs. More details on EPT technology and other options for platform security are provided below.

FIG. 1 is a block diagram illustrating some components and communication flows for an example embodiment of the PPT architecture. As indicated in the key, trusted components are illustrated in FIG. 1 with dotted fill. The bottom of FIG. 1 shows a trusted security engine 180 at the level of hardware and firmware. Security engine 180 may be used to assist in secure boot using cryptographic and hash operations, for instance. Security engine 180 may be used to ensure that the system boots to a trusted computing base (TCB), for example.

The logical level above the hardware and firmware may be referred to as the hypervisor space. A trusted PPT VMM 170 may operate in the hypervisor space. PPT VMM 170 may also be referred to as PPT hypervisor 170.

The next logical level up may be referred to as the kernel space. An untrusted PPT driver 150 may operate in the kernel space. Various interrupt handlers or interrupt service routines (ISRs) may also operate in the kernel space. For instance, PPT driver 150 may install a set of trusted ISRs (TISRs) 152 to operate in the kernel space. As described in greater detail below, TISRs 152 may serve as trampolines to allow execution to be transferred from an untrusted environment to a trusted environment and vice-versa. An untrusted security engine driver 160 may also operate in the kernel space. A software application running on a host OS or a guest OS may use security engine driver 160 to communicate with security engine 180.

In one embodiment, PPT provides a TEE by keeping only the components that are authenticated by trusted entities, such as hardware manufacturers, original equipment manufacturers (OEMs), or known third party vendors, in the trust control boundary of the data processing system. PPT deliberately keeps the operating system and other system libraries out of the TCB, because rooting the platform may result in installation of a malicious OS or malicious system libraries.

The next logical level up may be referred to as the user space. One or more untrusted applications 130 may run in the user space. Untrusted application 130 may use one or more sets untrusted libraries in the user space. Those untrusted library sets may include a set of untrusted PPT libraries (UPLs) 132. UPLs 132 may include an untrusted PPT loader 134. A set of trusted PPT libraries (TPLs) 122 may also be used in the user space. Untrusted application 130 may use PPT loader 134 and TPLs 122 to launch a trusted application (TA) 120. For instance, a developer may write TA 120 and statically link it against TPL 122. Launching or starting that combined static application may cause the system to create a TEE 124, with TA 120 executing within TEE 124.

Referring again to the kernel space, whenever a TA communicates with security engine 180, the TA encrypts the data and then sends it over the insecure channel of security engine driver 160. For instance, a TA that serves as a platform service TA may use security engine driver 160 to write a blob to secure storage managed by security engine 180 or to derive a symmetric encryption key for a given TA. Security engine 180 has the key to decrypt or encrypt the data being shared with the TA.

For purposes of illustration, this disclosure involves a hypothetical scenario in which untrusted application 130 is a banking application and TA 120 is a trusted authentication function that is launched and used by that banking application. However, as will be readily apparent to those of ordinary skill in the art, many other kinds of untrusted applications and trusted applications may use PPT.

FIG. 1 illustrates runtime relationships amongst various components. For example, FIG. 1 shows that TA 120 runs within the context of untrusted application 130. And the double-headed arrows on FIG. 1 pertain to communications between components at the different levels. For instance, arrow 190 shows the transfer of execution from untrusted to trusted environment and vice-versa going via TISRs 152 acting as trampolines. Arrow 192 shows the hypercall-based communication mechanism used by the untrusted or trusted applications to get service from VMM 170. Arrow 194 shows encrypted data flowing between untrusted frameworks via the untrusted security engine driver. Arrow 196 shows that security engine driver 160 is passing encrypted data to security engine 180.

Arrow 198 shows the services provided by VMM 170 to PPT driver 150. For example, this kind of communication may occur when PPT driver 150 uses VMM 170 to create a virtual interrupt descriptor table (IDT). Subsequently, when an interrupt/exception arrives, the processor indexes into the virtual IDT (VIDT) to obtain a pointer to the appropriate ISR among TISRs 152. That TISR may then determine whether (a) the interrupt/exception should be passed to an untrusted ISR (UISR) or (b) it should be handled by the TISR itself. Arrow 198 also represents the kind of communications which occur when PPT driver 150 registers the trusted ISRs 152 with VMM 170, so VMM 170 can install these ISRs in trusted memory.

Figure 2:
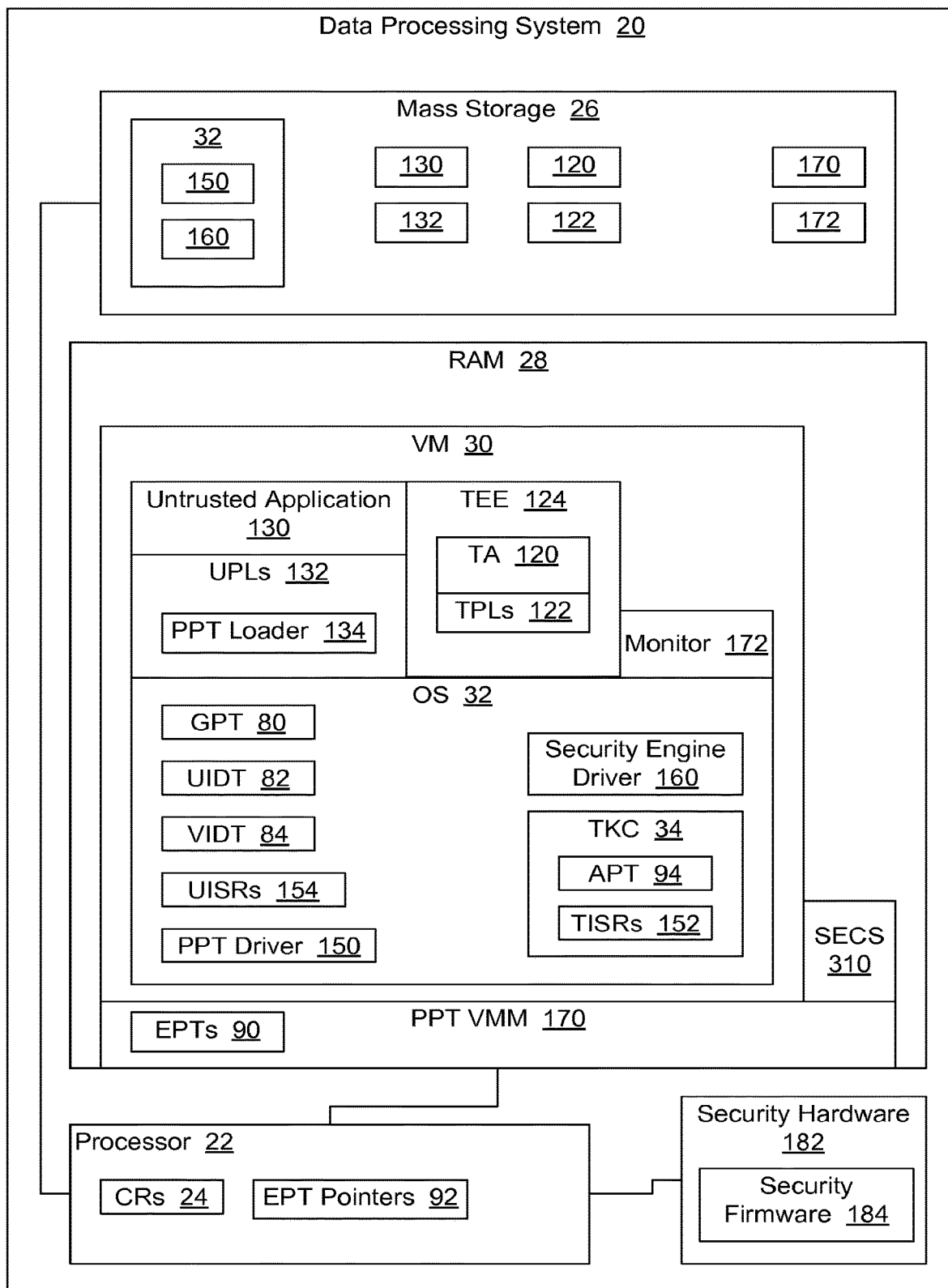
FIG. 2 is a block diagram illustrating an example embodiment of a data processing system that uses PPT to execute and protect one or more trusted applications.

FIG. 2 is a block diagram illustrating an example embodiment of a data processing system 20 that uses PPT to execute and protect one or more TAs 120. Data processing system 20 may be implemented as a portable or handheld computing device, such as a smartphone or a tablet, for instance, or as any other suitable type of computing device. For example, in one embodiment, data processing system 20 uses a processor 22 like those distributed by Intel Corporation under the name or trademark INTEL® ATOM, and data processing system 20 uses PPT architecture to run hypervisor 170 and to create TEE 124. Data processing system 20 may use VMM 170 to create isolated memory regions to host code and data belonging to security sensitive portions of an application running in a rich execution environment. VMM 170 may support features such as CPU virtualization (including descriptor table exiting) and memory virtualization, including support for EPTs and for virtualization functions or instructions. Those virtualization functions or instructions may include an instruction which enables VMs to use processor functions without exiting into the VMM. Those processor instructions may include an instruction for efficiently switching between the untrusted environment (or world) and the trusted world. In one embodiment, such an instruction may be referred to as a VMFUNC instruction, and that instruction may use the processor functionality of switching the EPTs (and thus transitioning between untrusted and trusted worlds) without causing a VMEXIT (i.e., without switching from the guest to the VMM world). Avoiding VMEXITS helps reduce or eliminate the cost of switching across untrusted and trusted worlds.

In the embodiment of FIG. 2, data processing system 20 includes at least one processor 22 in communication with various hardware components, such as RAM 28, mass storage 26, and security hardware 182. In one embodiment, all of those components may be implemented as a system-on-a-chip (SOC). In other embodiments, multiple different chips or other components may be used. For instance, mass storage 26 may be implemented using any suitable storage technology or combination of storage technologies, including without limitation a hard disk drive (HDD), a solid state drive (SSD), read-only memory (ROM), and/or other types of non-volatile or volatile storage technologies. In one embodiment, processor 22 represents one processing core, and security hardware 182 is part of a different processing core, with security firmware 184 residing on storage that is either embedded on that same core or linked to that core. Security engine 180 (from FIG. 1) may be implemented with hardware and related firmware, such as security hardware 182 and security firmware 184. Processor 22 may include various control registers (CRs) 24, such as CR3.

Mass storage 24 includes various sets of instructions that may be loaded into RAM 28 and executed by processor 22. Those sets of instructions may include software such as PPT VMM 170, a guest OS 32, untrusted application 130 with associated UPLs 132, and TA 120 with associated TPLs 122. And unlike FIG. 1, which focuses more on the runtime relationships between certain components, FIG. 2 depicts the logical separation of software components, data structures, and such. For instance, FIG. 2 shows that components such as TA 120 and untrusted application 130 are logically distinct from guest OS 32.

As shown, guest OS 32 may include an OS page table 80, which may also be referred to as guest page table (GPT) 80. In one embodiment, guest OS 32 may be an image of an OS distributed by Google Inc. under the name or trademark ANDROID. Other embodiments may use different OSs. OS 32 may also include an IDT 82 and associated ISRs 154, as well as other components, such as PPT driver 150 and security engine driver 160. VMM 170 may allow guest OS 32 to update that IDT and those ISRs. Accordingly, IDT 82 may be referred to as an untrusted IDT (UIDT 82), and ISRs 154 may be referred to as untrusted ISRs (UISRs) 154.

In addition, VMM 170 may create a trusted kernel context (TKC) 34 within the context of guest OS 32. VMM 170 may also install a VIDT 84 and associated TISRs 152 into guest OS 32. When installing VIDT 84, VMM 170 may also update a register in CRs 24 to point to VIDT 84 instead of UIDT 82. And when installing TISRs 152, VMM 170 may load them into TKC 34. VMM 170 may subsequently prevent guest OS 32 from modifying that register and from modifying the contents of TKC 34.

In the embodiment of FIG. 2, guest OS 32 operates within a virtual machine (VM) 30 that is created and managed by VMM 170. In addition, untrusted application 130 and TA 120 both run on top of guest OS 32, within that same VM 30. However, PPT enforces memory isolation between the trusted components and the untrusted components.

In addition, VMM 170 may load an asserted page table (APT) 94 into TKC 34. More details about APTs are provided below with regard to FIG. 7.

PPT may include unique memory management techniques in the TEE for dynamic memory allocation, shared memory, and garbage collection. PPT may provide these benefits without requiring the TA to be hosted in a separate OS or in an RTOS, and without requiring special hardware support or micro-code extensions.

PPT may provide a TEE that isolates portions (or all) of the code and data belonging to a third party application from the main execution environment, thereby enabling that third party application to operate as a TA. In particular, VMM 170 may use an EPT to provide a trusted view of code and data for that TA, while preventing untrusted applications from accessing that code and data. For instance, VMM 170 may use a different EPT for the untrusted applications, with that EPT providing an untrusted view of memory that does not include the memory in the trusted view. The memory in the trusted view may therefore be referred to as an isolated memory region.

In one embodiment, PPT uses hardware-assisted virtualization technology (VT), such as the technology distributed by Intel Corporation under the name or trademark INTEL® VT, to establish a trust boundary. PPT configures VMM 170 in a protected memory region. In particular, that protected memory region is inaccessible to OS 32 and to the other devices in the system. PPT VMM 170 hosts the memory for the code and data of TAs. In particular, VMM 170 uses EPTs 90 to protect the TAs, where the memory for each TA is mapped only in one EPT. Any unauthorized attempt to access a TA's memory results in an EPT violation, thereby assuring that only secure and authorized access to a TA's code and data is permitted. VMM 170 thus uses EPTs 90 to provide a trusted view of memory for each TA.

The TA itself is executed via the standard OS scheduler, resulting in no changes to the existing execution model and without the need for an RTOS. In other words, PPT does not require additional VMs. The VM with the untrusted runtime system (URTS) and the guest OS is the only VM running on top of the PPT VMM. The URTS and the guest OS may be referred to collectively as the rich execution environment (REE). The URTS may also be referred to as the untrusted framework. In one embodiment, one EPT is used to provide a trusted view for each TA, and another EPT is used to provide an untrusted view for the REE.

As described in greater detail below, PPT may also offer OS-agnostic memory management—including dynamic (heap based) memory allocation and cleanup after the execution of a TA under all circumstances, including unexpected TA crashes and the hosting service termination.

Part 1: Trusted Views

As indicated above, VMM 170 uses EPTs 90 to provide trusted views of memory and untrusted views. In particular, the example scenario depicted in FIG. 2 involves one untrusted application 130 and one TA 120. Accordingly, the example scenario involves two EPTs 90—one EPT for untrusted application 130 and its associated untrusted environment (including, e.g., OS 32), and another EPT for TA 120. The untrusted environment could also include multiple untrusted applications, and VMM 170 could use the same EPT for all of those untrusted applications. However, if multiple TAs were to be launched, VMM 170 would use a different EPT for each TA. Accordingly, the EPT for the untrusted environment provides an untrusted view of memory, and the EPT for TA 120 provides a trusted view.

In other words, an EPT is like a lens into memory, and the region of memory that can be accessed via an EPT constitutes a view. Similarly, a view may be thought of as a container, and this container may host or contain code and data. For instance, the view for TA 120 may contain the code and data for TA 120.

If an EPT has been created for a TA, that EPT may be referred to as a trusted EPT; and the view it provides may be referred to as a trusted view. Similarly, if an EPT has been created for the untrusted environment (which includes the guest OS and any untrusted applications running on that OS) that EPT may be referred to as an untrusted EPT, and the view it provides may be referred to as an untrusted view. For purposes of this disclosure, an untrusted view may also be referred to as view 0, and a trusted view may be referred to as view 1.

Each view runs with a unique EPT, thereby providing isolation from all other views. In other words, VMM 170 uses a unique EPT for each different view, so the software that runs in a given view is prevented from accessing the memory outside of that view.

The example scenario also involves one GPT 80, for untrusted application 130. As described in greater detail below, TA 120 does not use a GPT; instead, it uses one APT 94.

Figure 3:
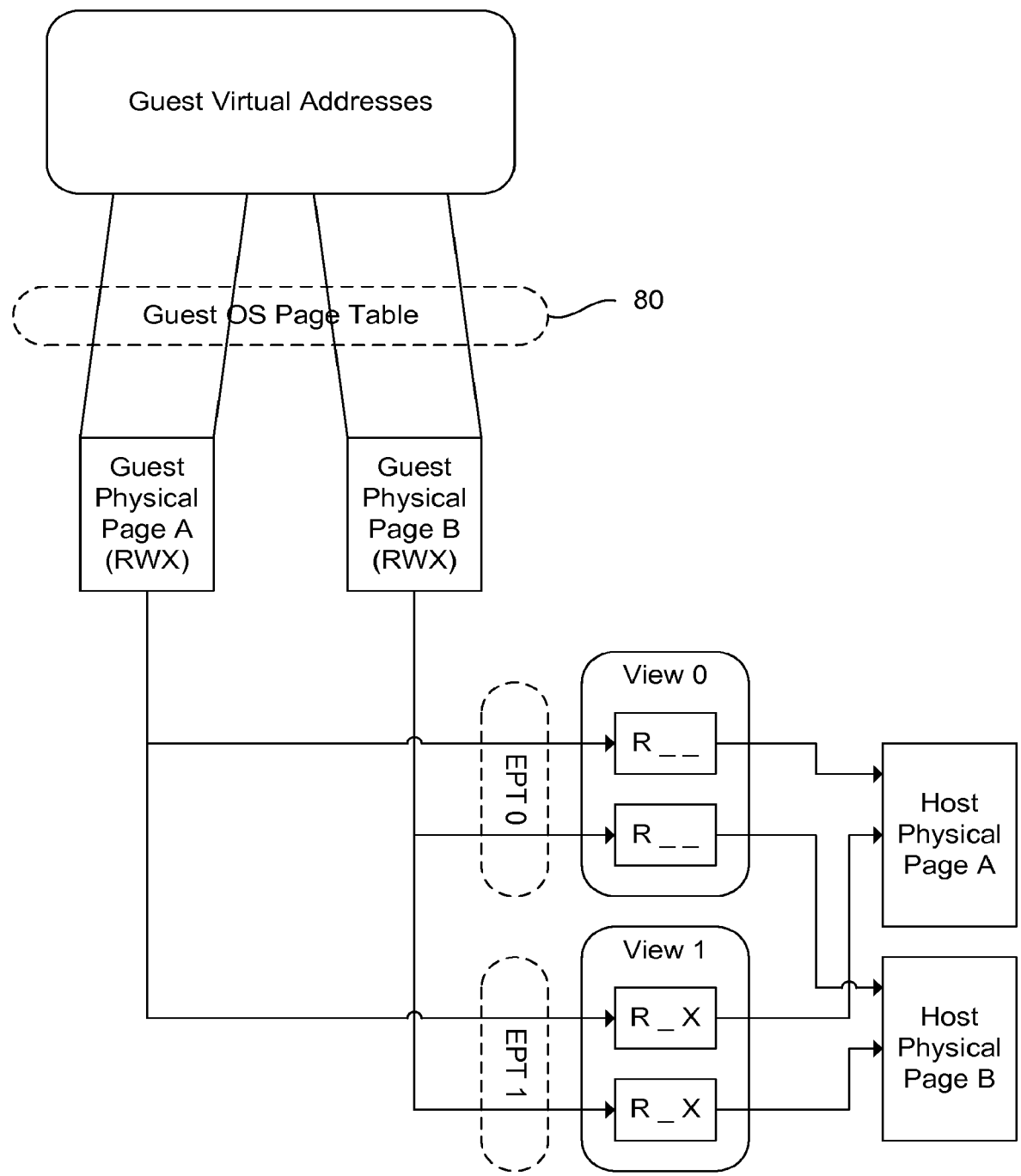
FIG. 3 is a flow diagram that illustrates how guest virtual addresses are translated into host physical pages, according to an example embodiment.

FIG. 3 is a flow diagram that illustrates how GVAs are translated into host physical pages, according to an example embodiment. For instance, FIG. 3 illustrates that guest OS 32 uses GVAs and GPT 80 to determine guest physical pages, such as a guest physical page A and a guest physical page B. In addition, FIG. 3 illustrates that VMM 170 uses EPTs to translate guest physical pages A and B into host physical pages A and B, respectively. Furthermore, FIG. 3 illustrates that different views may provide for different types of access for the same GVA. For instance, FIG. 3 illustrates how memory view 0 provides for read-only (R_ _) access to the host physical pages, while memory view 1 provides for read-and-execute access (R_X) to the host physical pages.

The PPT Driver

Referring again to FIGS. 1 and 2, PPT driver 150 manages multiple tasks, including setting up and managing VIDT 84 and hosting the ISRs for certain interrupts, such as interrupts 29, 30, and 31, for instance. In one embodiment, the ISR for interrupt 29 (Int-29) causes the currently executing process to transition from the untrusted code execution to a trusted view. The ISR for interrupt 31 (Int-31) causes execution control to transfer from the trusted view to the untrusted. The ISR for interrupt 30 (Int-30) causes the current process to resume a trusted view after having been interrupted by an asynchronous interrupt.

For purposes is this disclosure, interrupts which serve the purposes discussed above with regard to interrupts 29-31 may be referred to as a TA-enter interrupt, a TA-resume interrupt, and a TA-exit interrupt, respectively. In addition, those interrupts may be referred to in general as PPT interrupts. Similarly, the corresponding TISRs may be referred to as a TA-enter ISR, a TA-resume ISR, and a TA-exit ISR, respectively, and more generally as PPT ISRs. In other embodiments, other interrupt numbers may be used as PPT interrupts.

The PPT Hypervisor

Running at a higher privilege than guest OS 32, VMM 170 provides the required isolation of the code and data in a trusted view from rest of the views, including view 0 (i.e., the untrusted view). VMM 170 implements the multi-view model and manages the EPT pointers 92 for each view.

User applications and other OS-based software communicate with hypervisor 170 through hypercalls, which may be implemented either through cpuid or vmcalls.

In the example embodiment, VMM 170 executes at a higher privilege as it runs in the root mode as supported by the virtualization technology distributed by Intel Corporation under the name of trademark INTEL® VT or INTEL® VT-X. That virtualization technology may use virtual machine extensions (VMX) to provide for entry into the root mode. Accordingly, the root mode may be referred to as VMX root mode. In other embodiments, other technologies may be used to provide for similar functionality.

Also, VMM 170 manages EPTs to protect the memory that has been allocated from the memory space that is managed by VMM 170, thereby providing for isolation of guest-accessible physical memory. Each memory view is managed by the hypervisor using a separate EPT hierarchy. As indicated above with regard to FIG. 3, each EPT maps guest physical memory pages with appropriate read/write/execute permissions to the physical memory pages that guest OS 32 utilizes. VMM 170 may perform the processor page walk that translates the guest virtual address to the eventual host physical page in a nested manner.

In one embodiment, all trusted views constitute memory that has been allocated from the VMM heap and all untrusted views constitute memory with the same host physical address as the guest physical address allocated by the OS. For instance, an untrusted EPT may specify that GPA equals HPA, which practically means that guest owns the memory that is attempting to access. However, other embodiments may use other approaches. For instance, in other embodiments, the VMM may not allocate new host physical memory from its heap for trusted views, but may instead only change the permissions in the EPT.

Once one or more trusted views are constructed, the control to execution from trusted to untrusted view goes through the TISRs 152.

In one embodiment, an EPT defines a view by specifying access rights and a mapping from guest physicals pages to host physical pages. However, which application can access the view is controlled by a combination of TISRs 152 and VMM 170. For instance, a TISR in one embodiment may allow only the application that created the view to use that view. In another embodiment, that restriction can be relaxed by using a different TISR.

Also, as indicated above, in one embodiment VMM 170 runs in VMX root mode only. When VMX root mode is active, the EPTs are not active. The memory used by VMM 170 for its own code and data is not visible in either trusted or untrusted EPTs mappings, and thus it remains protected from the guest world. However, when data processing system 20 is running in guest mode (i.e., non VMX root mode), one of the EPTs will be used, to provide for memory protection.

Dynamic Memory Allocation

TA 120 may allocate memory dynamically.

Figure 4:
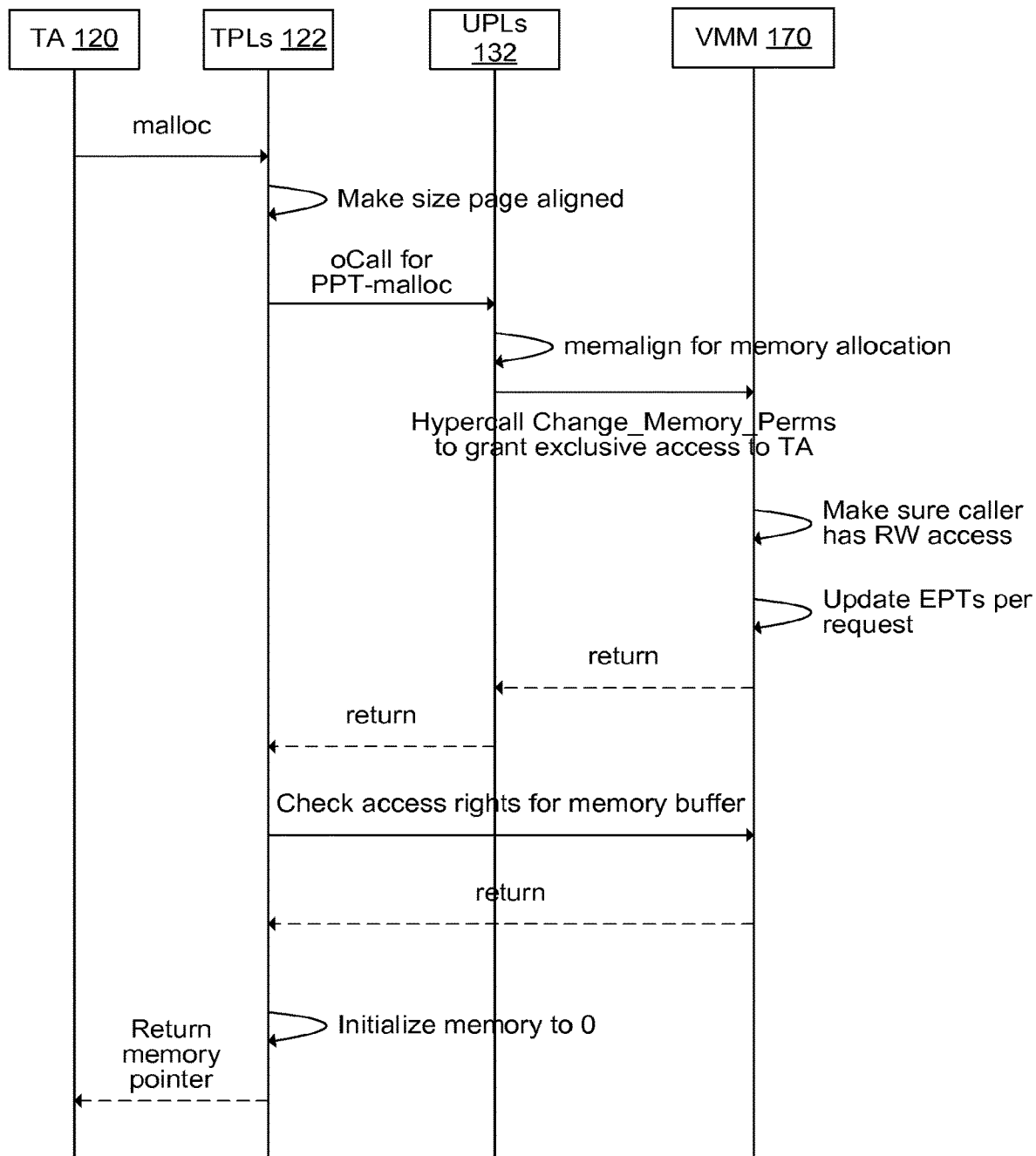
FIG. 4 is a flow diagram that illustrates an example overall flow for dynamic memory allocation, according to an example embodiment.

FIG. 4 is a flow diagram that illustrates an example overall flow for dynamic memory allocation by TA 120, after untrusted application 130 has launched TA 120. The flow of FIG. 4 starts with TA 120 executing with a trusted view of memory. In other words, VMM 170 is using a trusted EPT among EPTs 90 to provide a trusted view of memory for TA 120.

TA 120 may then use a trusted memory allocation instruction or function (e.g., malloc). TA 120 may call the trusted allocate function from a trusted side C library (e.g., tlibc) among the TPLs 122, for instance. The trusted allocate function may use an out-call (oCall) function, and the oCall function may temporarily exit from the trusted view to an untrusted view for the actual system call for memory allocation aligned on page size. The oCall function may use an untrusted allocate function (e.g., PPT-malloc) from UPLs 132 to perform the memory allocation operation, always on page boundaries. The allocate function from UPLs 132 may then make a hypercall to VMM 170, to instruct VMM 170 to give exclusive access to the newly allocated memory to the trusted view originally used by TA 120.

VMM 170 may then make sure that the caller (i.e., the allocate function from UPLs 132) has update (e.g., read-and-write or "RW") access, based on OS page table mappings. For instance, VMM 170 may walk GPT 80 to get the access permissions, page by page, for the range of virtual addresses that were just allocated. In other words, VMM 170 may determine whether GPT 80 provides the hosting process (which is running in an untrusted view) with RW access. For purposes of FIG. 4, the hosting process includes UPLs 132 and any other software executing within the view for the untrusted environment.

If the hosting process in the untrusted view does not have RW access, VMM 170 may fail the hypercall by returning an error in the return status. However, if the hosting process running has RW access, VMM 170 may update the trusted EPT among EPTs 90 for TA 120 with the requested permissions, after ensuring that the requested permissions do not give "execute" permissions on that memory. VMM 170 may thus dynamically adjust the view for TA 120 to include the allocated memory.

If TA 120 has requested exclusive access to the requested memory, the hypercall will convey that need/parameter to VMM 170. And to give TA 120 exclusive access, VMM 170 allocates protected memory from its heap and maps that memory in the EPT for the trusted view for TA 120.

On return from the PPT-malloc function in UPLs 132 to the trusted allocate function in TPLs 122, PPT-malloc returns the address of the allocated memory buffer or region. As indicted below, the trusted allocate function may subsequently return that memory pointer to TA 120. Thus, virtual address allocation is happening in the untrusted environment, and VMM 170 is mapping a new physical region identified by HPAs to that same virtual address range.

After PPT-malloc has returned the memory pointer to the trusted allocate function, the trusted allocate function may then ensure that memory buffer access rights are exclusive to TA 120.

Figure 5:
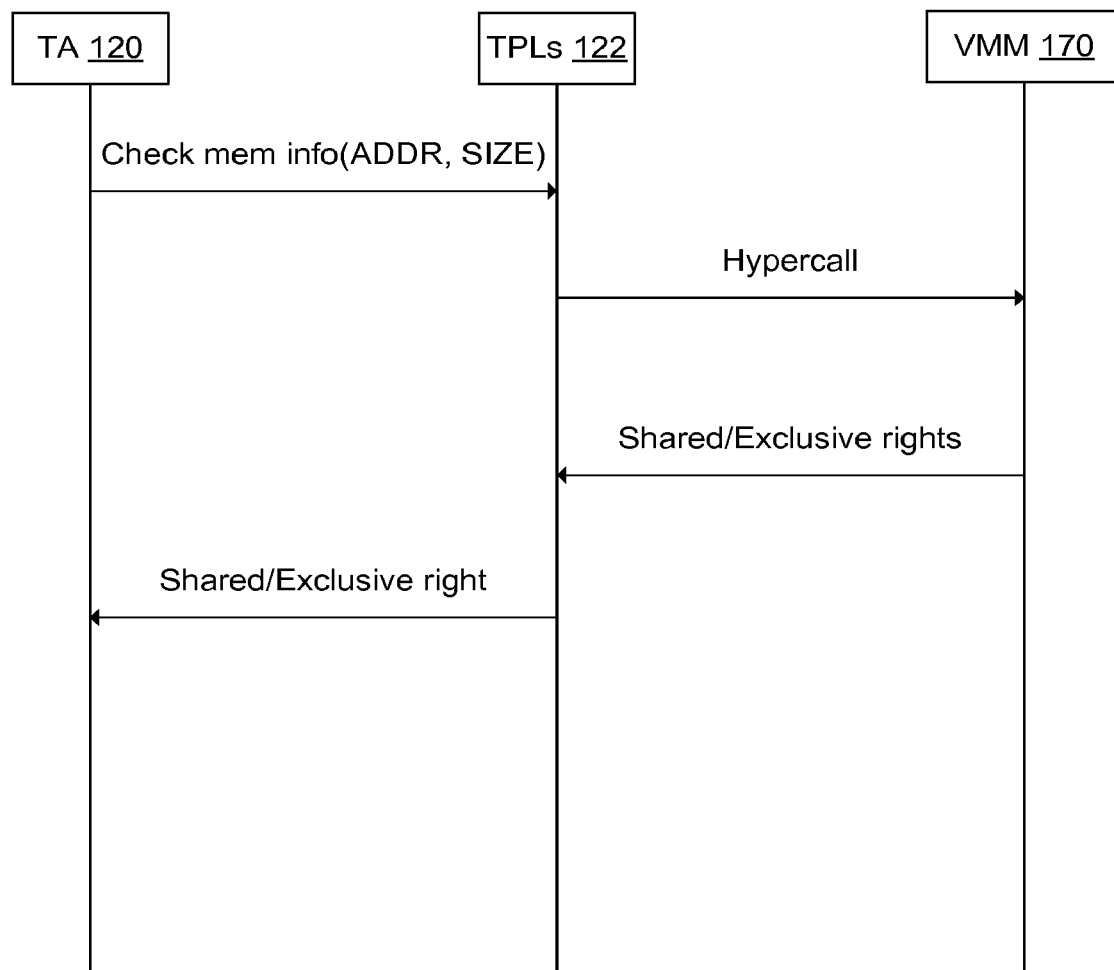
FIG. 5 is a flow diagram that illustrates an example process for checking access rights, according to an example embodiment.

FIG. 5 is a flow diagram that illustrates an example process for checking access rights. As illustrated, TA 120 can use TPLs 122 to pass a memory address and size to VMM 170 with a rights inquiry. In response, VMM 170 may indicate whether TA 120 has exclusive rights or shared rights over the specified memory range. Also, the memory range can be of any type (e.g., malloc'ed memory, stack memory, or shared memory.

Referring again to FIG. 4, TLPs 122 may then initialize the allocated memory before giving the pointer back to TA 120. Alternatively, TLPs 122 may skip the initialization step, for instance if VMM 170 has copied data from untrusted guest memory to memory allocated by VMM 170. Also, in other embodiments or scenarios, the hypercall to give exclusive TA access to memory may be called from contexts other than the malloc context.

As can be seen from FIG. 4, PPT ensures that TA 120 gets growing heap as per the runtime requirements. More importantly, this is done in a secure manner where the trusted application library gets to ensure the right permissions are given to the memory pages in question through a hypercall.

PPT also provides TA 120 with a memory freeing function (e.g., "Free") to be called from the trusted environment, and that function may behave very similarly to malloc mentioned above except that it frees the previously allocated memory.

Shared Memory

PPT also provides for shared memory for scenarios including the following: (i) untrusted application 130 shares a buffer with TA 120, or vice versa; and (ii) TA 120 shares a buffer with another TA. The two entities between which sharing happens may or may not be in the same process.

In an example process, TA 120 shares memory with another TA, which may be referred to as TA2. Also, those two TAs reside in different processes. The sharing process involves two main steps: sharing and mapping.

For the sharing step, TA 120 creates a first buffer. TA 120 then requests VMM 170 to share the first buffer with a list of entities—TA2 in this case. VMM 170 creates local data structures for managing shared memory and returns a buffer handle to TA 120. This buffer handle may be referred to as a shared memory handle.

For the mapping step, VMM 170 passes the shared memory handle to the process in which TA2 resides. TA2 then creates a second buffer with a starting address. Using the starting address for the second buffer and the shared memory handle, TA2 requests VMM 170 to map to the shared buffer. In response, VMM 170 updates the EPT for TA 120 and the EPT for TA2 so that those EPTs map the same physical pages to the virtual pages of buffers created by TA 120 and TA2. Hence, TA2 can access the shared data of TA1 by accessing the buffer created by TA2.

If TA 120 and TA2 reside in the same process, then TA2 doesn't need to create a new buffer. It may just call the map request with same buffer address created by TA1.

Also, to make this solution generic, TA 120 or TA2 can be replaced by an untrusted application in the above flow.

One benefit of this solution is that no data is copied. Another benefit is that the OS is not involved in data sharing. VMM 170 manages the shared memory. The memory can only be accessed by the TAs that have been granted explicit access by VMM 170. Hence, the shared memory is secure.

Memory Cleanup

Garbage collection of a TA should be done when memory is no longer required. Other than the clean termination of the TA, memory may no longer be required if the TA crashes during execution or if the process that created the TEE session exits.

Figure 6:
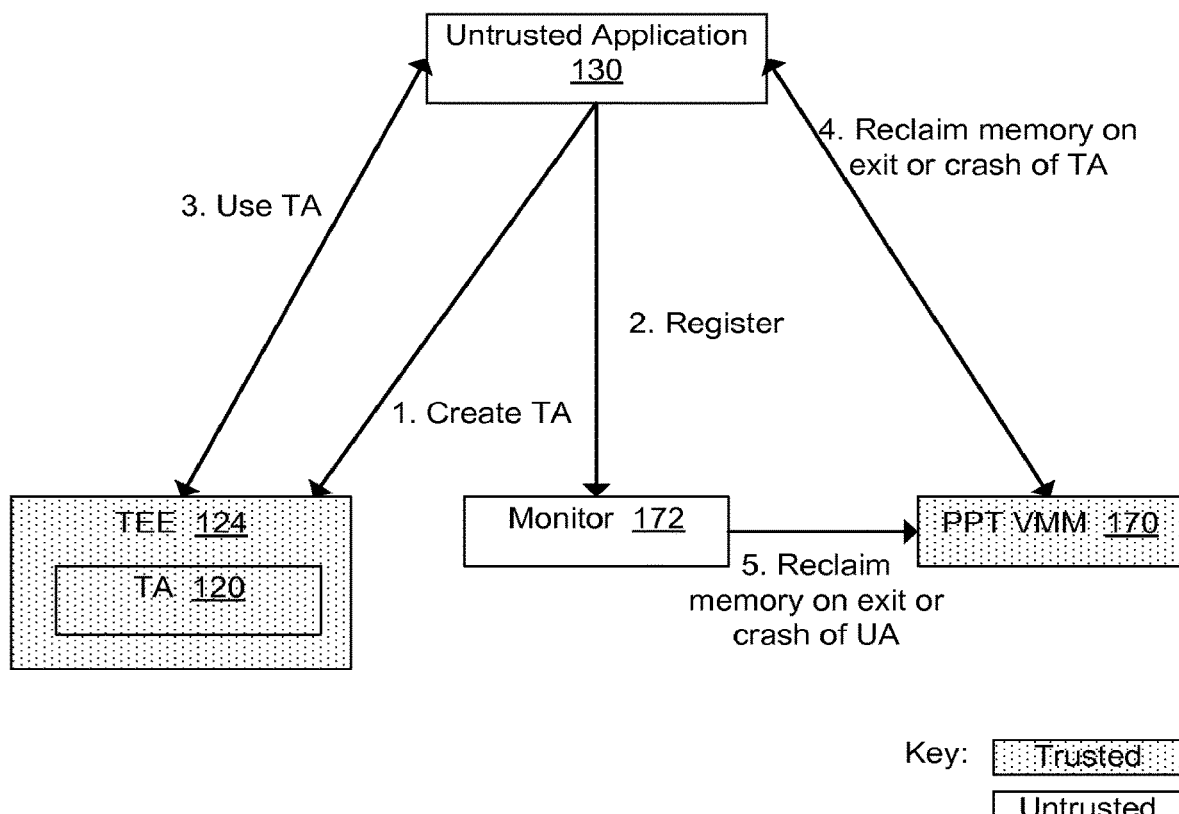
FIG. 6 is a flow diagram that illustrates an example overall flow for cleaning up memory, according to an example embodiment.

FIG. 6 is a flow diagram that illustrates an example overall flow for cleaning up memory. As shown at arrow 1, a caller process (e.g., untrusted application 130) creates the trusted application in a TEE (e.g., TA 120 in TEE 124). For instance, untrusted application 130 may use PPT loader 134 to create TA 120.

In addition, data processing system 20 starts a special process called the monitor 172 at boot time. In one embodiment, monitor 172 is an untrusted process that operates more or less in parallel to untrusted application 130 and TEE 124, and monitor 172 keeps track of all the processes that create a TA. For instance, as shown at arrow 2, once untrusted application 130 creates TA 120, untrusted application 130 may connect itself with monitor 172. In particular, one of UPLs 132 executing in the context of untrusted application 130 may connect with monitor 172, using named pipes or any other suitable mechanism, including portable OS interface (POSIX) inter-process communication (IPC) mechanisms like signals, sockets, etc. As shown at arrow 3, untrusted application 130 may then use TA 120.

Once execution of TA 120 is complete, the caller process (untrusted application 130) checks whether TA 120 crashed during its execution. If untrusted application 130 determines that TA 120 exited or crashed, untrusted application 130 may perform memory cleanup straight away, as shown at arrow 4. Otherwise, untrusted application 130 may continue to run. Once untrusted application 130 exits, the pipe between untrusted application (UA) 130 and monitor 172 breaks. This is a trigger to the monitor process to initiate garbage collection, as shown at arrow 5.

This garbage collection is independent of any OS or RTOS, since this a protected TA memory which even the OS does not have access to. VMM 170 keeps track of the memory assigned to each TA and relies on the monitor process and the untrusted side process to initiate the cleaning process. If the TA crashes, the untrusted side process (e.g., untrusted application 130) should initiate the cleaning of the TA memory. If the untrusted side process itself crashes, then the monitor process will initiate the garbage collection.

Part 2: Asserted Page Tables

An APT uses a different approach to provide protection similar to that provided by an SPT. One difference between an APT and an SPT is that the APT is not maintained based on page faults. Instead, the PPT VMM creates an entry in the APT for each code page and each data page associated with the TA when the TA is being loaded into the memory. For instance, as indicated below, PPT loader 134 may automatically instruct VMM 170 to create the entries for APT 94 on a page-by-page basis, as PPT loader 134 loads each page for TA 120 into memory.

This approach improves the run time performance of the TA, since it mitigates constant VM-exits and VM-entries caused due to page faults. An APT also leads to better performance because the page table footprint is small. The PPT VMM only puts entries in the APT for the memory that needs to be accessed by the TA. This also results in smaller memory requirements for an APT, compared with an SPT.

Additionally, when an APT is created, the memory to hold the APT is not allocated from the guest OS memory, but from an isolated memory region to which the guest OS has no access. Memory virtualization is used to explicitly give access to the APT only to the TA which owns it. The OS cannot read or write to these pages. Instead, the APT is managed completely by the PPT VMM. Since the guest OS cannot modify entries in the APT, the aforementioned attacks are mitigated.

A benefit of using an APT is that it can be used in systems that don't employ a real-time OS (RTOS) and it can be used without specialized processor instructions. By contrast, other systems may require an RTOS running on a different processor to provide a secure page table for a TA. Furthermore, an APTs is created by a VMM which is in the TCB of its system.

Referring again to FIG. 2, in the example scenario, VMM 170 creates APT 94 when TA 120 is being loaded into RAM 28. The memory for APT 94 is protected from the view of OS 32. Hence, OS 32 cannot read or write to it. APT 94 is completely managed in the VMX root mode by VMM 170.

As described in greater detail below, when PPT loader 134 loads TA 120, PPT loader 134 registers each of the code and data pages for TA 120 with VMM 170. In response, VMM 170 walks the OS page tables and gets the GVA to GPA mapping for that page and the page attributes, and VMM 170 then creates a similar entry in APT 94. This continues until the whole TA is loaded. While registering TA pages with the hypervisor, PPT loader 134 also sends page type (Code/Data/Guard Page) as a parameter to VMM 170, and VMM 170 sets appropriate permissions (RX/RW/RO) for those pages in APT 94.

Once all the pages of TA 120 are registered, PPT loader 134 signals VMM 170 to lock down APT 94. From that point onwards, no more entries for additional code pages can be added to APT 94.

For each entry to be created in APT 94, the memory is taken from an isolated memory region to which OS 32 has no access. That isolated memory region may be managed by VMM 170. In one embodiment, the hypervisor gives the owner TA exclusive rights to the APT memory using an approach like that described above with regard to FIG. 4.

Just before the entering TA 120, one of the TISRs 152 updates the control register (CR) that is supposed to point to the page table base for TA 120 (e.g., CR3) to make that CR point to the APT root for TA 120.

Figure 7:
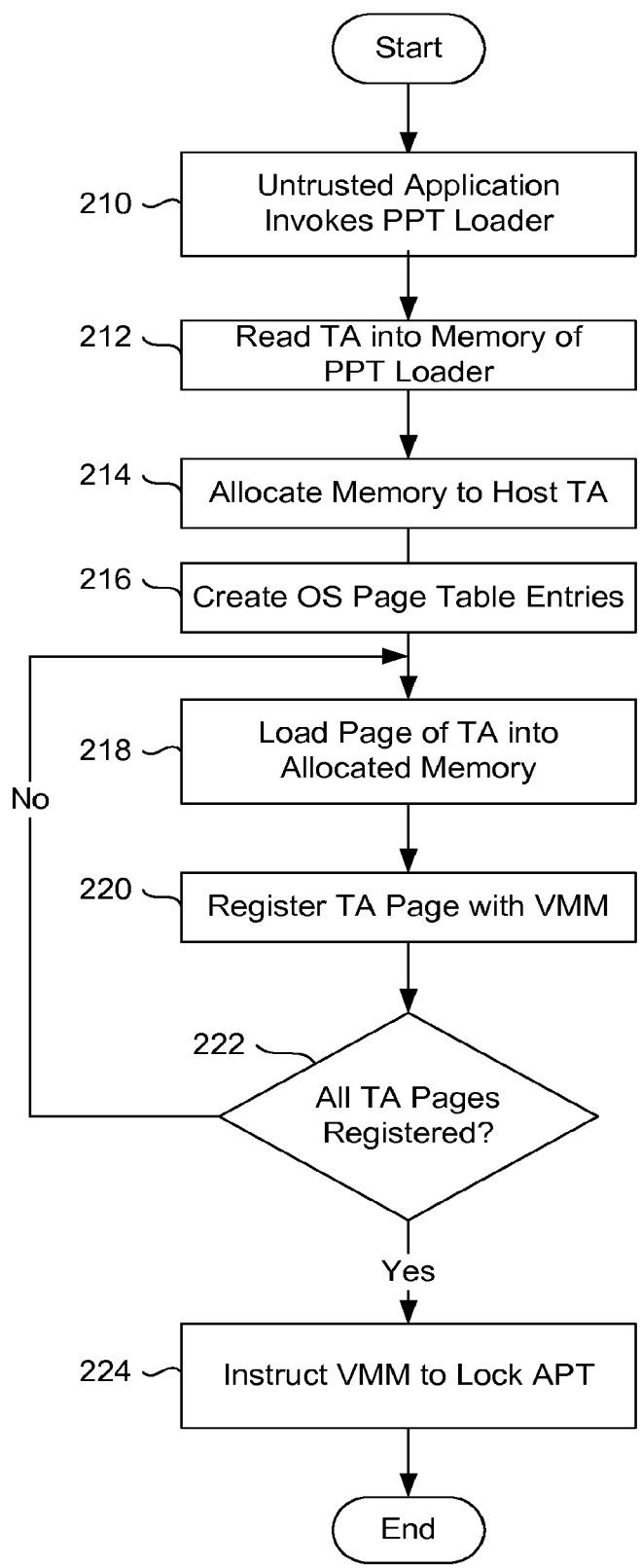
FIG. 7 presents a flowchart depicting operations associated with creating an asserted page table (APT), according to an example embodiment.

FIG. 7 presents a flowchart depicting operations associated with creating an APT, according to an example embodiment. In particular, FIG. 7 depicts those operations primarily from the perspective of PPT loader 134. The illustrated process starts at block 210 with untrusted application 130 invoking PPT loader 134 to launch TA 120. In response, as shown at block 212, PPT loader 134 reads all of TA 120 into memory. For instance, PPT loader may read TA 120 into PPT loader's memory space. As shown at block 214, PPT loader 134 may then allocate dynamic memory equivalent to the size required to host TA 120. After PPT loader has finished loading TA 120 into that memory as described below, that memory will include code, static data, stack memory and some other special pages.

As shown at block 216, this dynamic allocation will cause OS 32 to create entries in GPT 80 for the allocated pages. As shown at block 218, PPT loader then parses the TA image that was read, and copies the contents from the first page into the allocated memory. Additionally, PPT loader registers that page with VMM 170, as shown at block 220. As described in greater detail below with regard to FIG. 8, VMM 170 may then add that page to the trusted view for TA 120.

As shown at block 222, PPT loader 134 may then determine whether all of the pages for TA 120 have been loaded and registered. If they have not, the process may return to block 218, with PPT loader 134 loading and registering each page, one by one, as indicated above.

After all of the pages have been loaded and registered, PPT loader 134 may instruct VVM 170 to lock APT 94, as shown at block 224.

Figure 8:
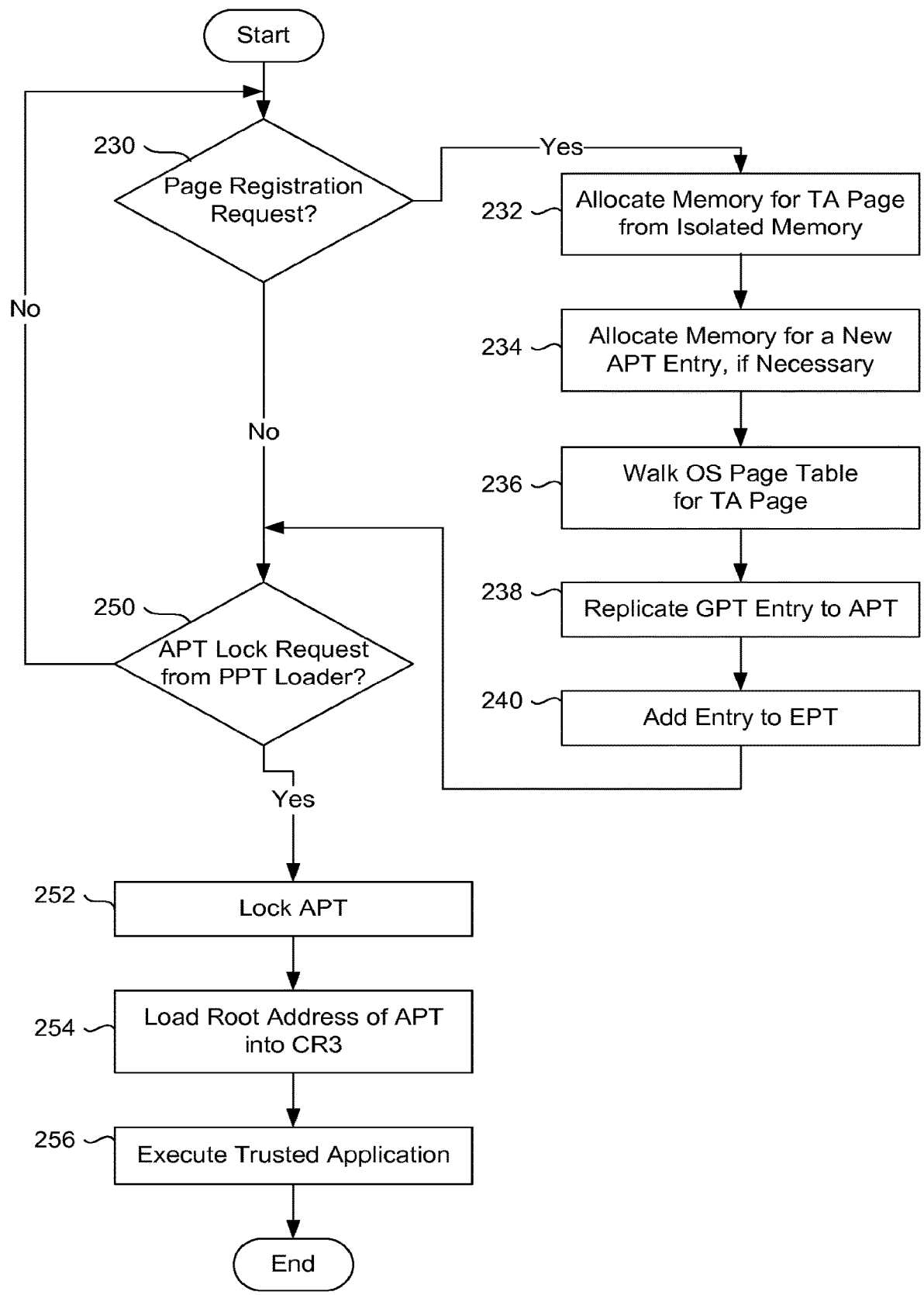
FIG. 8 presents another flowchart depicting operations associated with creating an APT, according to an example embodiment.

FIG. 8 presents another flowchart depicting operations associated with creating an APT, according to an example embodiment. In particular, FIG. 8 depicts those operations primarily from the perspective of VMM 170. Those operations may start at block 230 with VMM 170 determining whether it has received a request from PPT loader for registration of a page for TA 120. If PPT loader is registering a page with VMM 170, as shown at block 232, VMM 170 may allocate memory for that TA page from the isolated memory region.

Also, as shown at block 234, if APT 94 needs another page to accommodate another entry, or if this is the first entry and thus the first page for APT 94, VMM 170 may allocate a page for APT 94 from isolated memory. As shown at block 236, VMM 170 may then walk GPT 80 for that virtual page address to get the corresponding GPA. VMM 170 may then add that same mapping from GVA to GPA to APT 94 by creating a new entry, as shown at block 238. As shown at block 240, VMM 170 may then allocate a new entry in the EPT for TA 120 by mapping the GPA to the HPA from block 232.

As shown at block 250, VVM 170 may then determine whether PPT loader 134 has instructed VMM 170 to lock APT 94. For instance, PPT loader 134 may identify the code pages for TA 120, and PPT loader may instruct VMM 170 to lock the APT entries for those pages. In response, as shown at block 252, VMM 170 may consider APT 94 to be locked with regard to code pages, and VMM 170 may therefore prevent any further code pages from being added to APT 94. However, other dynamic heap pages may be added to the view for TA 120, and thus to APT 94, later on. For example, in shared memory situation, an untrusted view may want to share some memory with the trusted view; and in that case, VMM 170 may add entries to APT 94 corresponding to the shared memory.

As shown at block 254, after VMM 170 has locked APT 94, a TA-enter ISR from TISRs 152 may load the root address for APT 94 into CR3. That TA-enter ISR is called at the time of enter flow. In other words, after TA 120 is created by the process described through block 252, untrusted code flow may want to enter into TA 120 for initialization or using services exposed by TA 120. On each entry into TA 120, the trampoline flow loads the root address for APT 94 into CR3, to switch to the trusted view page table. As described in greater detail below, that trampoline flow may be executed by one of TISRs 152.

Accordingly, TA creation may end at block 252, and TA entry may start at block 254, with the view switching from untrusted to trusted. Then, as shown at block 256, VMM 170 causes TA 120 to start executing with a trusted view, and the process of FIG. 8 may end.

Subsequently, a TA-exit ISR may switch from the trusted view to an untrusted view by modifying CR3 to point to GPT 80.

Figure 9:
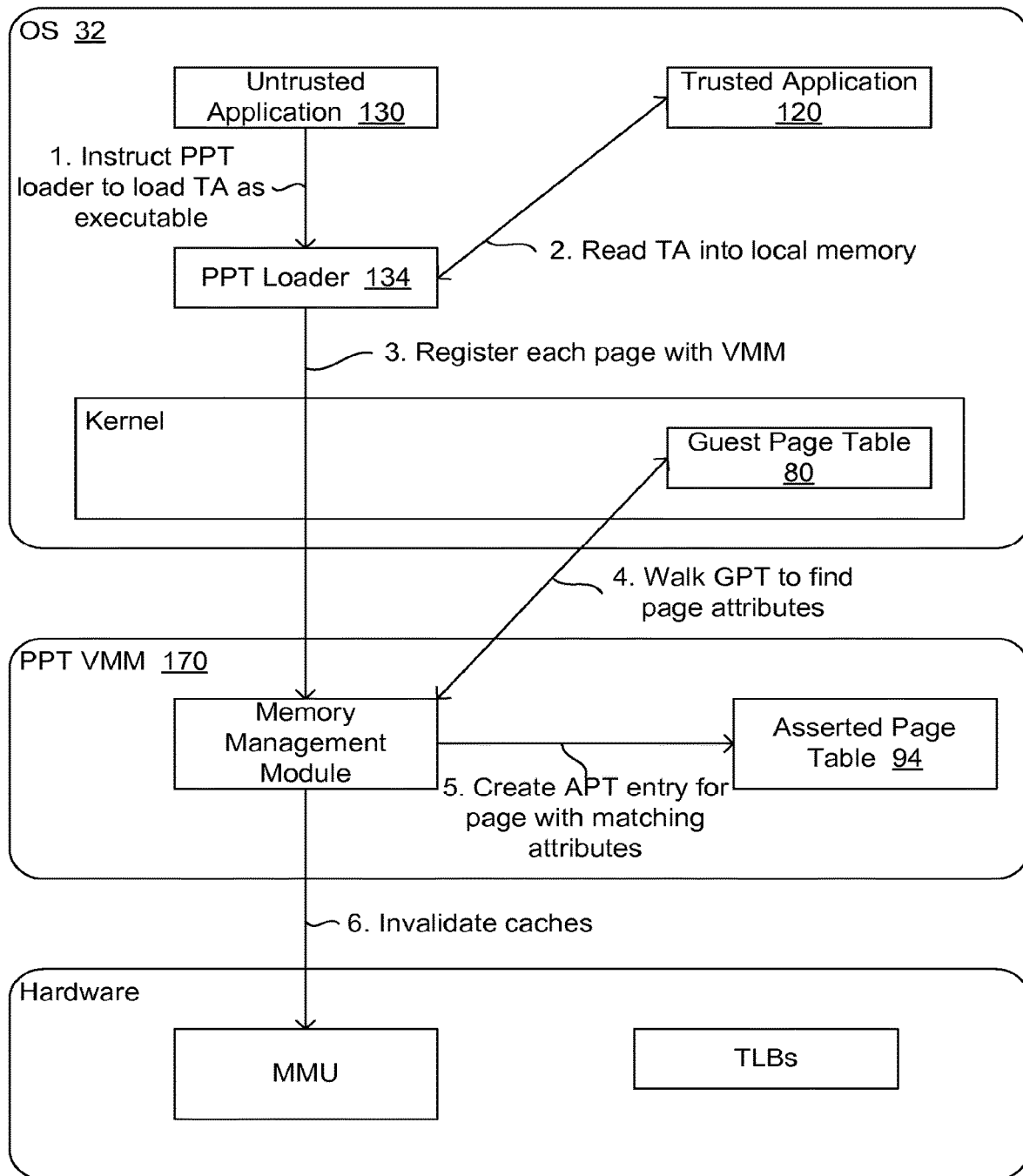
FIG. 9 is a block diagram illustrating some of the operations associated with creating an APT.

FIG. 9 is a block diagram illustrating some of the operations associated with creating APT 94. In addition to the operations described above, FIG. 9 shows that VMM 170 invalidates internal caches such as TLBs that contain GVA to HPA mappings and mappings between GPAs and HPAs, to ensure that the guest software is able to address the correct physical page when referenced through the GVA. Also, at arrow 5, FIG. 9 illustrates the memory management module creating an APT entry for a page. In particular, the memory management module may configure that entry with page attributes that match the page attributes in GPT 80 and with page permissions based on the page type.

Part 3: Virtual Interrupt Descriptor Tables

Jumping to the middle of a function by compromising the caller stack is a common security concern. The impact of this exploitation is heightened if a jump could be done from untrusted to trusted application space, as such a jump would break the TEE itself. To mitigate this, a common approach is to develop an architecture where the jump from untrusted to trusted space is made to a predetermined location in the TEE, and the TEE then jumps to a particular trusted method after setting up the trusted environment.

A jump to a TA may also happen after an interrupt has taken execution out to the OS handler, and then the runtime resumes the TA execution from the point it was interrupted. A malware/rootkit may attack the untrusted runtime and jump to an arbitrary location in the TA which can compromise the security. A system with TEEs based on a hypervisor may use the technology described by ARM Ltd. under the name or trademark TRUSTZONE to switch into and out of the secure world. However, that technology requires specialized hardware instructions and a special hardware mode, and it requires running the TEE in the context of a secure OS host which runs in secure world mode. Consequently, that technology requires the VMM to do either paravirtualization or full virtualization.

This part describes PPT features that obviate the need for special hardware support and the need for the VMM to provide full or complete virtualization, to enable the data processing system to run both a secure OS and an unsecure OS. For instance, as described in greater detail below, a data processing system with PPT may use a VIDT to facilitate safe entry in the TA. Furthermore, the data processing system may run the TEE in the context of an unsecure OS itself. Consequently, switches to secure world and insecure world are as simple as changing the EPT pointers, and that change may be performed by a single CPU instruction.

Referring again to FIG. 2, entry into a TA 120 happens primarily for two reasons: (1) untrusted application 130 calling TA 120 to make use of functionalities exposed by TA 120, and (2) resuming from an asynchronous exit that happened due to various interrupts and/or exceptions while running TA 120 code. In the first case, data processing system 20 may use the TA-enter ISR as a trampoline to jump to a pre-determined location in TA 120. In the second case, data processing system 20 may use the TA-resume ISR to safely resume the TA 120 code from the next instruction pending when the interrupt happened.

Figure 10:
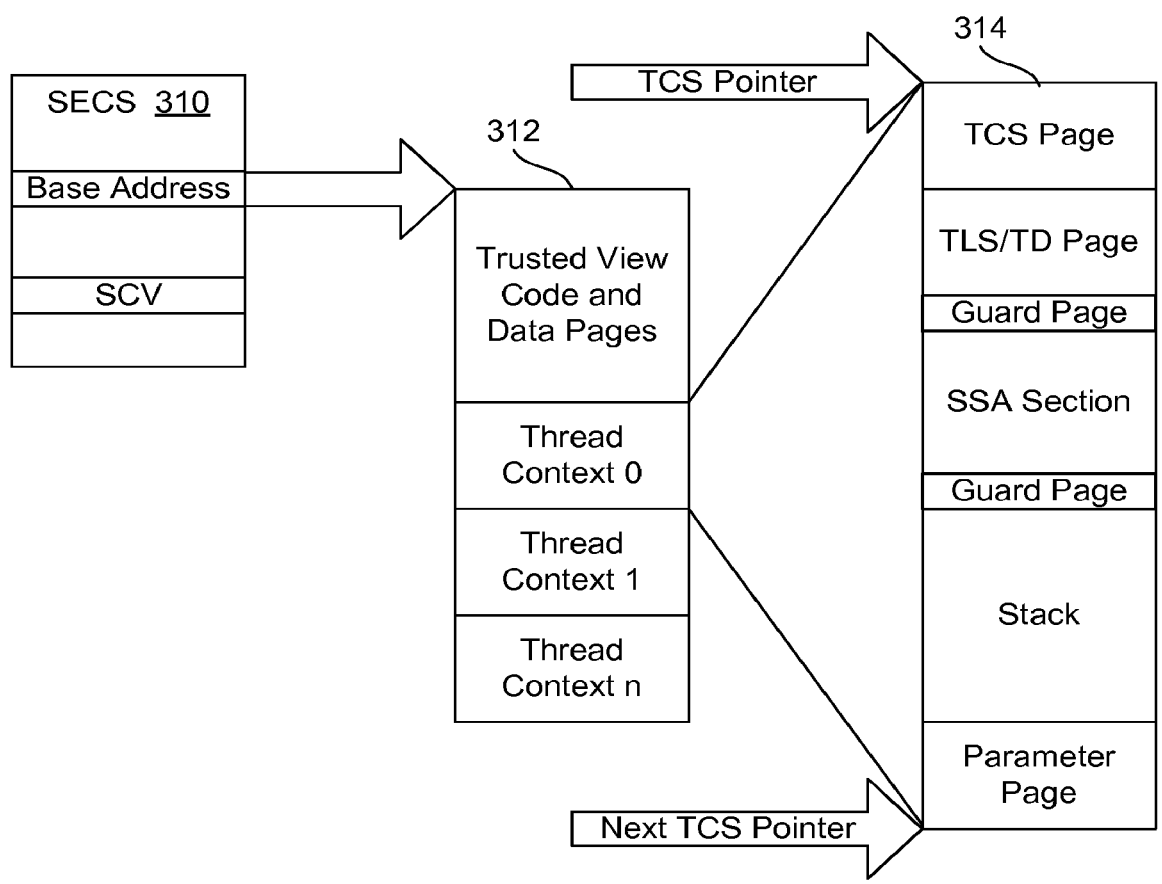
FIG. 10 is a block diagram illustrating various secure data structures accessed by a trusted interrupt service routine, according to an example embodiment.

FIG. 10 is a block diagram illustrating various secure data structures accessed by TISRs 152, according to an example embodiment. Such data structures may be referred to in general as PPT data structures (PDSs). One of those structures is an SGX Enclave Control Structure (SECS) 310. SECS 310 may be implemented as a shared page between VMM 170 and TISRs 152. VMM 170 may create one SECS for each TA. SECS 310 contains data for managing TA 120, such as the base address for TA 120. For instance, after PPT loader 134 has loaded TA 120 into memory, PPT loader 134 may allocate memory and copy the TA code, data, and thread context related pages in this memory. The start address of this allocated memory becomes the TA base address. PPT loader 134 may then pass that base address for TA 120 to VMM 170 as part of a create_view( ) hypercall. VMM 170 may then store that base address in the SECS page for the newly created view.

As illustrated, the trusted view 312 for TA 120 may include code and data pages from TA 120 and TPLs 122. Trusted view 312 may also include one or more thread context data structures (TCDS) 314, to store context data for each thread within the TA 120 process. As illustrated, TCDS 314 may contain a thread control structure (TCS), thread local storage (TLS) for thread data (TD), a state save area (SSA), guard pages, a stack page, a parameter page, etc. TCDS 314 and each structure within TCDS 314 may also constitute a secure data structure that is accessed by TISRs 152.

Each PDS may be accessible to and used by different components. For instance, the TD may be accessible to and used by TA 120, the TCS may be accessible to and used by TISRs 152, SECS 310 may be shared between VMM 170 and TISRs 152, the SSA may be used only by TISRs 152, etc. However, data processing system 20 may create a distinct set of PDSs for each view, and those PDSs may be allocated from VMM heap memory.

In one embodiment, PPT loader 134 prepares the TLS as part of the process for initializing some thread specific-structures for the TA 120. One or more programs from TPLs 122 on the trusted side then take the initialized content of the TLS and do some relocations on the structure members and create a TD. With regard to FIG. 2, SECS 310 may reside in RAM 28 outside of VM 30, as a trusted page shared between VMM 170 and TISRs 152.

Figure 11:
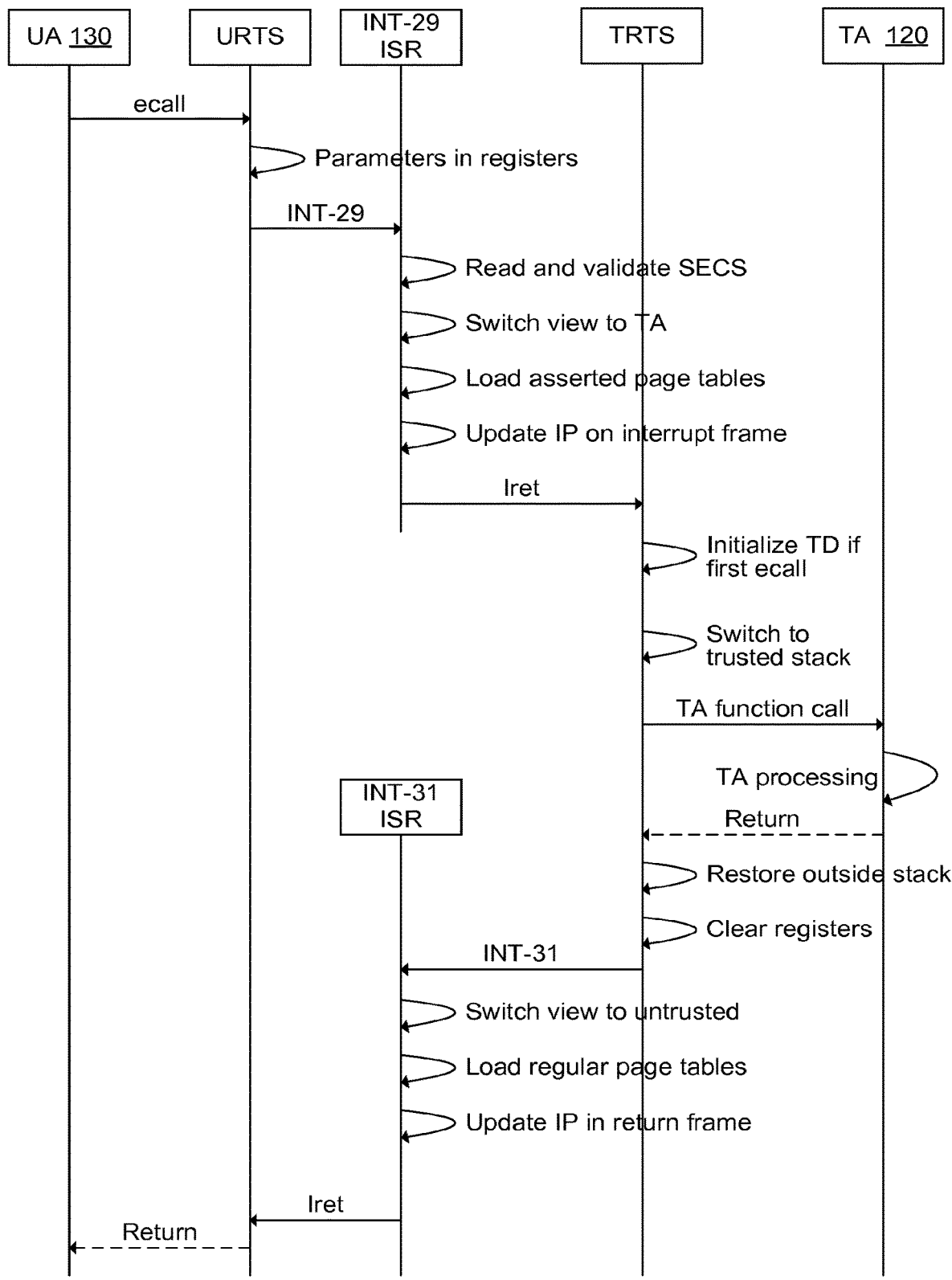
FIG. 11 is a flow diagram that illustrates entry to and exit from a TA using trusted interrupt service routines, according to an example embodiment.

FIG. 11 is a flow diagram that illustrates entry to and exit from TA 120 using TISRs, according to an example embodiment. In particular, FIG. 11 illustrates an example flow involving a typical call from untrusted application 130 to TA 120.

However, before the process of FIG. 11 begins (for instance, when the binary for TA 120 was being built), the developer will have defined a common entry point for TA 120 using an Executable and Linkable Format (ELF) symbol in the ELF header in the binary for TA 120. That entry point may be defined in terms of an offset from the base address. Also, data processing system 20 will have created the TCS for TA 120, and data processing system 20 will have stored the entry point offset in the TCS.

In addition, to is protect confidentiality and integrity, the TCS is included in an offline signature process which includes hashing the content of all code and data pages for TA 120 (which pages include TCDS 314) and signing the hash with the Rivest-Shamir-Adleman (RSA) private key of the TA vendor. The content that is hashed may be referred to as the TA blob. VMM 170 subsequently performs (a) hash verification to ensure the integrity of the TA blob (including the integrity of the TCS) and (b) signature verification using the RSA public key of the TA vendor to ensure the confidentiality of the TA blob (including the confidentiality of the TCS).

Untrusted application 130 may then use PPT loader 134 to load TA 120 into memory.

As illustrated in FIG. 11, untrusted application 130 may then make a call to TA 120. In particular, untrusted application 130 may parse the ELF header for TA 120 to extract various symbols, such as the entry point offset, and untrusted application 130 may then call a function or execute a statement for entering the trusted view, using that that offset as a parameter.

For purposes of this disclosure, a function or statement for calling a trusted application from an untrusted application may be referred to as an entry call. In some embodiments, entry calls may be implemented as ecall or Se_ecall functions in a UPL such as UPLs 132. As described in greater detail below, an ecall function may use a TA-enter interrupt to invoke a TA-enter ISR, and the TA-enter ISR may use the VMFUNC instruction to switch from an untrusted view to a trusted view.

In particular, in the embodiment of FIG. 11, when the ecall function is called, the URTS responds by loading the parameters from the call into registers and then invoking the reserved TA-enter interrupt (e.g., Int-29). The URTS may invoke the software interrupt using an "int" instruction, for instance. Data processing system 20 may then automatically launch the corresponding TA-enter ISR from TISRs 152, based on VIDT 84.

In one embodiment, VIDT 84 uses teachings like those described in U.S. Pat. No. 8,578,080 to handle such interrupts. For instance, VIDT 84 may include an exit stub for exiting from the view of the interrupted program to the view of the TISR registered in VIDT 84, and a re-entry stub for each TA for switching the view of the interrupt handler back to the view of the interrupted program. Also, VIDT 84 may reside in a host memory page that has a permission view of read-only to all other programs to disallow tampering of the VIDT 84.

As shown in FIG. 11, once the TA-enter ISR has been launched, it may read and validate SECS 310. If SECS 310 is valid, the TA-enter ISR then uses the VMFUNC instruction to switch to the trusted view of TA 120. In addition, the TA-enter ISR switches to the trusted page table (i.e., APT 94) to mitigate against page remapping attacks. The TA-enter ISR also copies all of the general purpose register (GPR) state, including the return instruction pointer (RIP) that was automatically saved by the hardware on "int", along with the hardware saved register state, to the trusted ring-0 stack to further enhance the security. In addition, the TA-enter ISR reads the entry point offset from TCS 314.

In one embodiment, data processing system 20 uses EPT protections to protect the TCS and the other PDSs, so that the EPT for the untrusted view does not have permission to access these private data structures. Consequently, the TA-enter ISR may rely on the offset being correct. The TA-enter ISR then retrieves the base address of TA 120 from SECS 310, and adds the offset to the base address. This addition gives the actual entry point address of TA 120.

The TA-enter ISR then replaces or overwrites the RIP that was automatically saved by the hardware on "int" with the entry point address for TA 120. The TA-enter ISR then executes an interrupt return or "iret" instruction, which cause control to jump to that entry point.

If this is the first ecall, the TRTS (e.g., one or more programs in TPLs 122) initializes the TD for TA 120 by adding the TCS address to various fields in the TLS that were populated by PPT loader 134. And even though the TLS may have been considered untrusted when it was initialized by PPT loader 134, it may be considered to be a confidentially and integrity protected data structure because subsequently, as a part of a trusted page, all the initialized content of the TLS will have been copied to the protected memory by VMM 170. And the initialization may be considered reliable because the TLS was also a part of the TA blob that was hashed and signed and later verified by VMM 170.

After initialization, TD contains a pointer to the trusted stack. The TRTS then uses that trusted stack pointer to switch to the trusted stack, since the TA execution must use the known private stack for saving local variables and return addresses of the TA functions. The TRTS may then pass control to TA 120, and TA 120 may then execute.

After the TA function returns, control for the TA entry-exit flow goes back to TRTS (e.g., one or more programs in TPLs 122), and the TRTS then safely returns back by invoking the TA-exit interrupt (e.g., Int-31). As a part of this safe return, the TA exit code clears the GPRs, thus protecting the information from leak through registers. In addition, the TA exit code switches back to the untrusted stack before invoking the TA-exit interrupt.

The TA-exit ISR would then switch to the untrusted view and load the regular OS page tables by pointing CR3 to the OS page table base at GPT 80. Also, the TRTS passes the return IP in one of the registers, and the TA-exit ISR loads that IP to the interrupt stack return frame. The TA-exit ISR than executes an Iret, which causes control to jump to the next instruction to the enter instruction (i.e., the next instruction after the TA-enter interrupt). In response, the URTS then properly returns control back to the caller of ecall (i.e., untrusted application 130).

Figure 12:
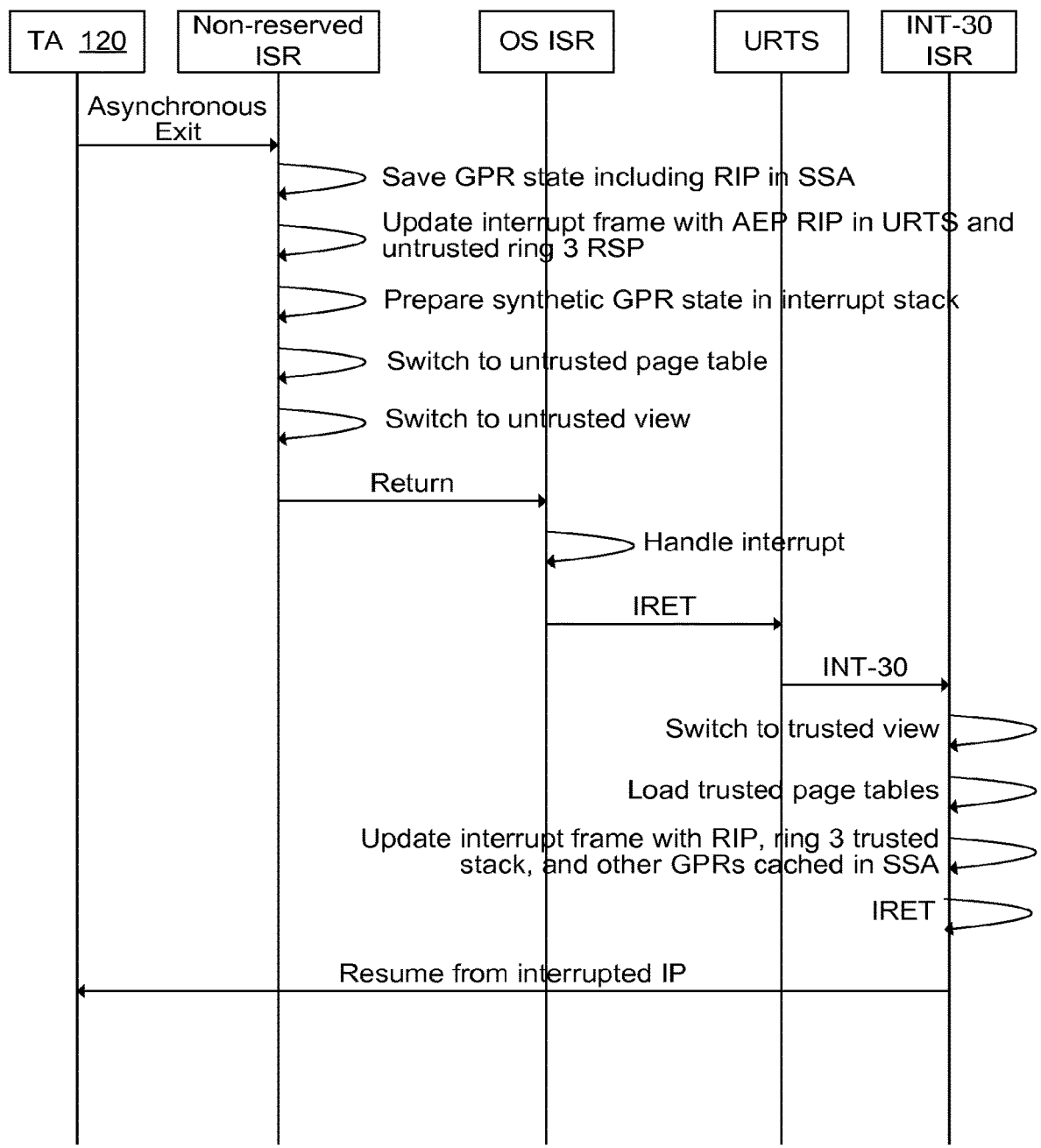
FIG. 12 is a flow diagram that illustrates asynchronous exit from and resume to a TA, according to an example embodiment.

FIG. 12 is a flow diagram that illustrates asynchronous exit from and resume to TA 120, according to an example embodiment. Such a resume from an asynchronous exit may happen when an interrupt comes while executing the TA code.

If an interrupt occurs while executing TA 120, the interrupt causes an asynchronous exit. VIDT 84 is set up to ensure that a trusted ISR executes for each such asynchronous exit. For instance, in response to the interrupt, VIDT 84 may cause a general purpose (GP) or "non-reserved" ISR from TISRs 152 to determine whether the currently executing code is using a TA. For example, that TISR may use a view-id function to determine whether the current view is a trusted view. If the current view is not a trusted view, then the TISR hands over the interrupt to the guest OS's interrupt handler.

However, as indicated in FIG. 12, if the current view is a trusted view, the TISR saves the current GPR state, including the RIP, in the SSA, which is a data region in TA 120 that is not visible outside the trusted view.

The TISR also replaces the RIP on the current stack with the asynchronous exit pointer (AEP) of the untrusted runtime in the interrupt stack. The TISR also replaces the trusted runtime stack pointer (RSP) with the untrusted RSP on the interrupt stack. This is done so that an "iret" can jump to a known exit point in the URTS.

Also, the TISR prepares synthetic GPR state on the interrupt stack. This ensures that the potential trusted secret information available in the GPRs is not exposed to the outside world. One of the GPRs in the synthetic state contains a flag indicating that, for control to come back to TA 120, the control must come from the resume flow.

The TISR then switches from trusted to untrusted page tables (e.g., by switching CR3 from pointing to APT 94 to GPT 80).

The TISR then switches from trusted view to untrusted view using VMFUNC. The TISR then switches from trusted ring-0 stack to untrusted ring-0 stack. The TISR then copies all of the synthetic GPR state to the untrusted stack. The TISR then jumps to the OS ISR by executing a return instruction. The OS ISR then handles the interrupt.

The OS ISR then executes an "iret," at which point the control gets transferred to the AEP in the URTS. The URTS then pushes the target view id in another GPR. In other words, the URTS saves the identifier for the view-to-enter in a register. The URTS then triggers the reserved TA-exit interrupt (e.g., Int-30) using the "int" instruction.

Then, the rest of the flow for re-entering TA 120 after an asynchronous exit may be similar to the synchronous entry, except that the entry point is taken from the RIP entry in the SSA. Also, the GPR state of trusted at the time of the asynchronous interrupt is taken from the SSA and put in the trusted ring-0 stack, so that on "iret," the architectural state is preserved on re-entry to TA 120.

Part 4: Secure Cookie Values

A TEE requires at least one data structure that contains state information for correct and secure execution. For instance, in one embodiment, PPT involves an SECS for each TA, a TCS for each TA, etc., as indicated above. Such data structures need to be secured against read, write, and execute access from the untrusted world. Some techniques to provide protection through encryption or restricted permissions utilize OS-managed page tables or VMM-managed EPTs. However, those techniques may be too complicated or insufficient, considering the variety of attacks that are possible.

This disclosure introduces a secure cookie value (SCV) that is obtained from a secure hardware agent and that is used by a trusted software block (such as VMM 170) to patch software that is protected with regard to integrity and confidentially (such as TA 120). After patching, this SCV becomes a part of the protected software. The SCV is then compared with a corresponding value in an EPT-protected data structure. In one embodiment, that EPT-protected data structure is SECS 310. In case of a mismatch, execution of the protected software is aborted before that software can leak out any security sensitive information from the TEE. This solution may also be immune to attacks based on page remapping. For instance, this solution provides protection even if a compromised OS kernel performs memory remapping of the private data pages of the TEE.

To protect the private data of TA 120 running in the context of TEE 124, the trampoline code that allows transitions in and out of TA 120 perform SCV checks. In one embodiment, that trampoline code is implemented as TISRs 152. The SCV itself is randomly generated by hardware and cached by VMM 170. VMM 170 then writes or patches the SCV into the TISR flow. For instance, VMM 170 may patch the SCV to various instruction offsets in TISRs 152. In addition, VMM 170 writes the SCV into the SECS for TA 120 (i.e., SECS 310). Then, before transferring control to TA 120, one or more of the programs in TISRs 152 checks the SCV in SECS 310 against the SCV that was patched into TISRs 152 to make sure they match. The TISR aborts execution of TA 120 if the check fails. Thus, the checks compare a randomly generated (by hardware) SCV stored in an EPT protected data structure (SECS 310) with the value patched by a trusted software entity (VMM 170) in the trampoline code (TISRs 152), and the trampoline execution is aborted if the check fails. Consequently, TEE 124 is not activated.

The physical contents of SECS 310 in the trusted world are hidden using EPT-based memory virtualization techniques. But the trampoline execution requires that the correct data structure is referenced in the trampoline code even if the page tables of the OS are manipulated by an attacker to map the data structure's virtual address to a different physical page. The random secure cookie checks protect against this type of attack.

Figure 13:
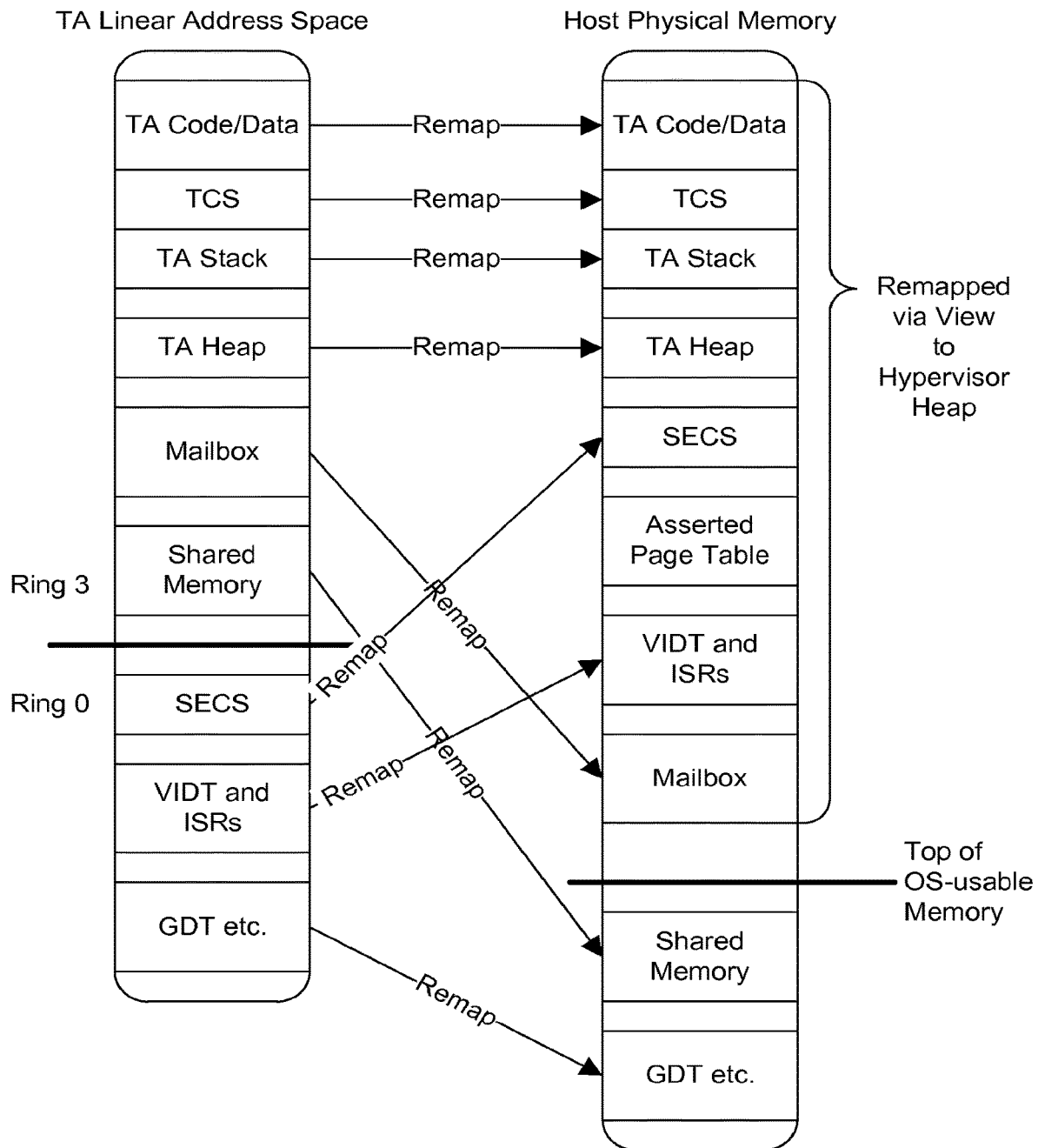
FIG. 13 is a block diagram that illustrates memory mapping for a TA between a virtual address space and a physical address space.

FIG. 13 is a block diagram that illustrates memory mapping for TA 120 between a virtual address space and a physical address space. As indicated above, a virtual address may also be referred to as a linear address. Accordingly, FIG. 13 depicts the guest virtual address space for TA 120 as a "TA Linear Address Space," and FIG. 13 depicts a corresponding "Host Physical Memory." Accordingly, the illustrated data structures may be accessed through the same virtual address for both TEEs and untrusted REEs. However, the physical copies of the data structures are kept different, based on EPT mappings.

In particular, FIG. 13 shows that, in the linear address space, structures such as the SECS, the VIDTs, the ISRs, the global descriptor table (GDT), etc. are only accessible to software running at the highest privilege level (e.g., ring 0). In addition, FIG. 13 shows that the current view remaps some objects to host physical memory addresses that are above the top of the memory that is addressable by the OS. In particular, the GDT and shared memory reside below the top of OS-usable memory, but other components (e.g., the TA code and data, the SECS, etc.) reside above the top of OS-usable memory. As indicated in FIG. 13, the components residing above the top of OS-usable memory have been remapped via a view to the hypervisor or VMM heap.

Consequently, those components are protected from direct memory access (DMA) attacks. Some devices may use DMA to directly access the physical memory (i.e., to access physical memory without going through page tables or EPTs to get linear to physical address translations). However, VMM heap is allocated from a special memory pool that is hardware protected against DMA access. Thus, VMM memory is protected against DMA-based attacks, which might otherwise lead to data theft or unintended code execution.

The GVA to GPA mapping is controlled by the OS page tables, which are not in the TCB of the system. PPT ensures that the private copies of the data structures are valid through the mechanism of SCVs, which do not require specific OS support, and which also provide protection from page remapping attacks (which involve changes the OS page table entries). In addition, SCVs do not require private page tables to be set up to map virtual addresses to secure physical addresses.

In one embodiment, every TA (e.g., TA 120) running inside a TEE (e.g., TEE 124) has its private SECS (e.g., SECS 310). SECS 310 is used while entering TA 120 and exiting from TA 120. The data in SECS 310 is unique to TA 120, and SECS 310 is accessed only by protected trampoline pages, such as TISRs 152. SECS 310 cannot be accessed by any other trusted or untrusted component outside of the TCB for TA 120.

In addition, components must be running at the highest privilege level (e.g., ring 0) to access pages containing SECS 310. And TISRs 152 run only at the highest privilege level. Also, VMM 170, which runs beneath OS 32, maps the SECS pages and the TISR trampoline pages to ring 0. VMM 170 also configures those trampoline pages with execute-only permission.

During initialization of VMM 170, VMM 170 uses a random number generator in processor 22 or security hardware 182 to obtain a random number or nonce to serve as the system SCV. VMM 170 then patches that SCV into TISRs 152 to add the cookie in the code where the comparison will take place. VMM 170 also writes that SCV into SECS 310 at the time of TA creation. Subsequently, the trampoline code compares the patched SCV with the SCV in SECS 310. Also, if there are multiple TA's, VMM 170 may give each TA the same SCV.

Figure 14:
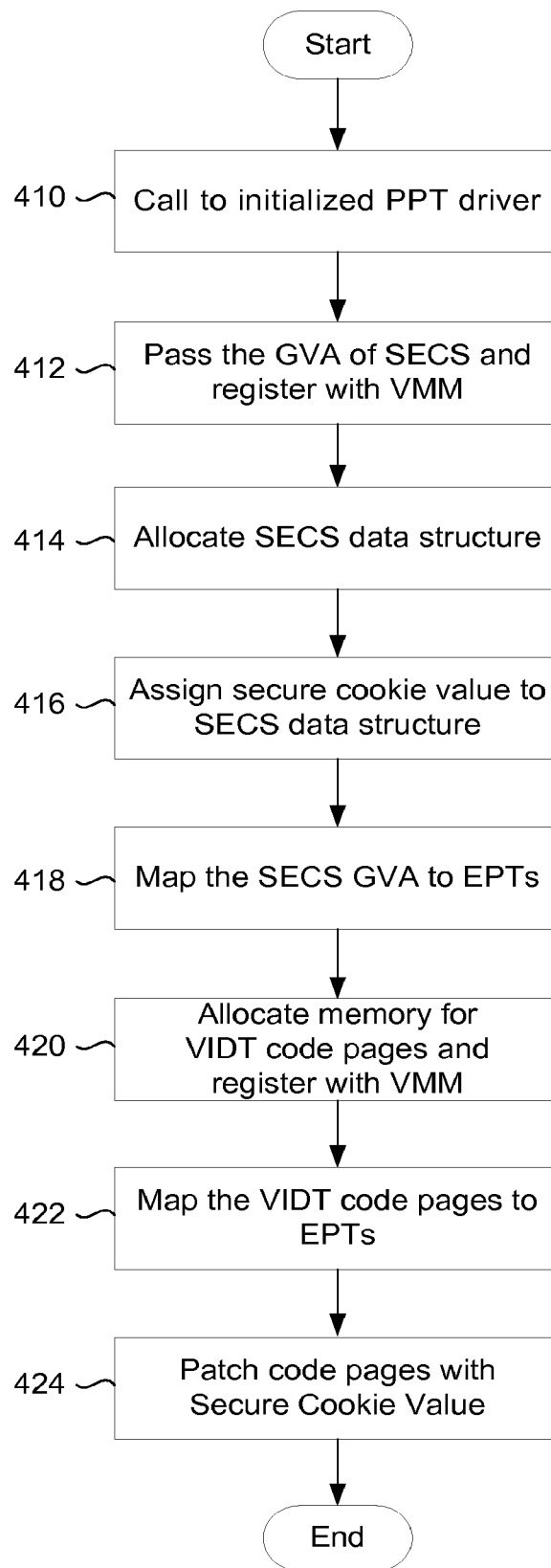
FIG. 14 presents a flowchart depicting operations associated with creating and saving a secure cookie value according to an example embodiment.

FIG. 14 presents a flowchart depicting operations associated with creating and saving an SCV according to an example embodiment. The illustrated process starts at block 410 with PPT loader 134 calling PPT driver 150, for instance in response to untrusted application 130 calling TA 120. PPT driver 150 may have already been initialized.

As shown at block 412, PPT driver 150 may then pass the GVA of SECS 310 to VMM 170 with a request to register SECS 310. As shown at block 414, PPT driver 150 may then allocate the SECS 310 for TA 120.

As shown at block 416, VMM 170 may then load an SCV into SECS 310. As indicated above, VMM 170 may have obtained that SCV when VMM 170 was initialized. As shown at block 418, VMM 170 may then map the GVA of SECS 310 in the APT for TA 120 (i.e., APT 94), and VMM 170 may create EPT mappings to map the GPA for SECS 310 to the page that was allocated for SECS, as indicated in block 414.

As shown at block 420, PPT driver 150 may then allocate memory for VIDT code pages for each CPU in data processing system 20. For instance, PPT driver 150 may allocate memory for TISRs 152. PPT driver 150 may also register those pages with VMM 170. As shown at block 422, VMM 170 may then map the VIDT code pages to EPTs 90. As shown at block 424, VMM 170 may then patch the binary for TISRs 152 with the SCV. The process of FIG. 14 may then end.

Figure 15:
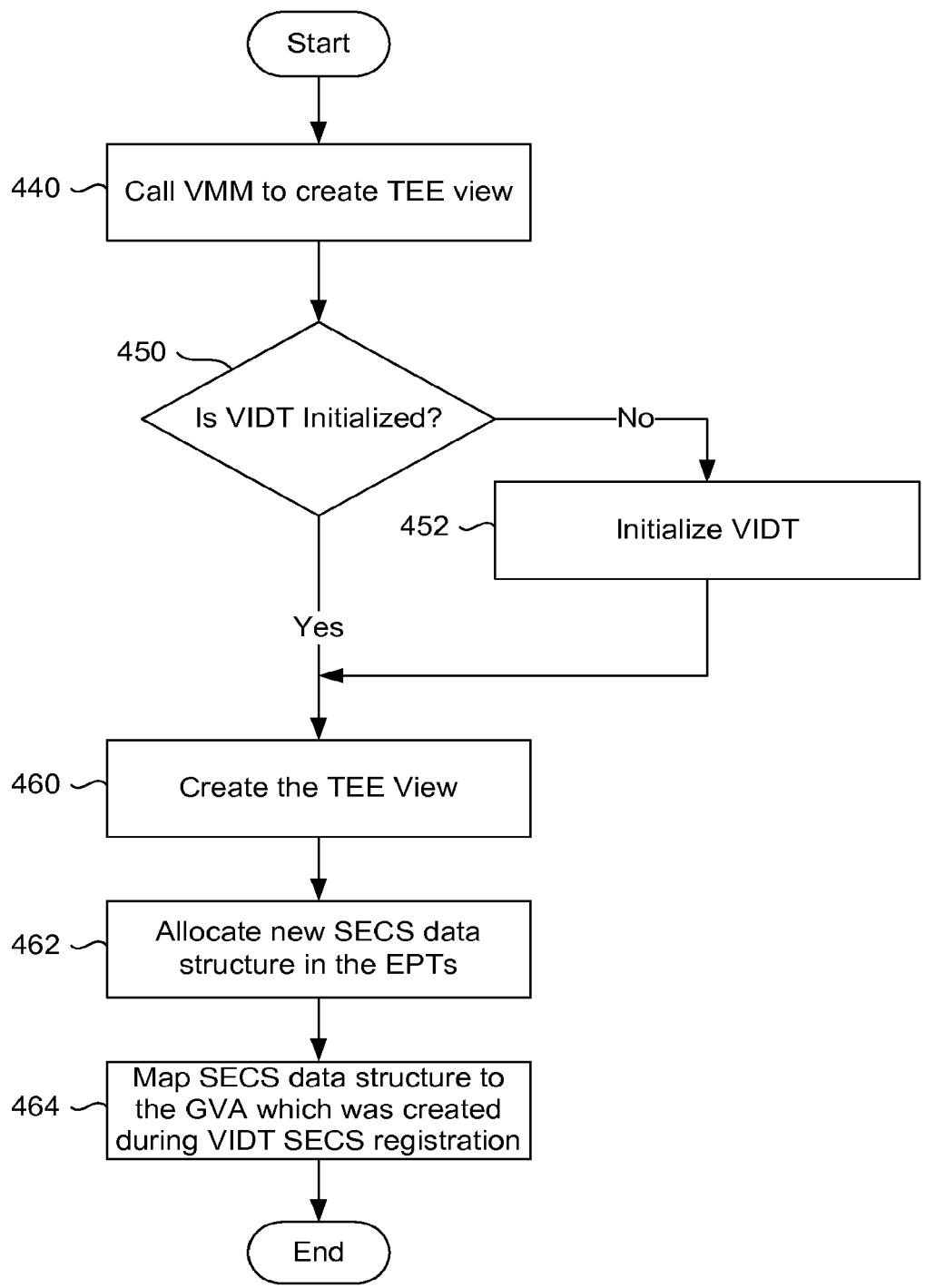
FIG. 15 is a flowchart of an example embodiment of a process for creating a PPT data structure for storing a secure cookie value.

FIG. 15 is a flowchart of an example embodiment of process for creating a PPT data structure for storing an SCV. In particular, the example process involves creating SECS 310 for TA 120. That process may start at block 440 with PPT loader 134 calling VMM 170 to create a trusted view for TEE 124 and TA 120. As shown at block 450, VMM 170 may then determine wither VIDT 84 has been initialized yet. If it has not, VMM 170 may initialize VIDT 84, as shown at block 452. For instance, VMM 170 may perform signature and hash verification of the TISR flows and then install TISRs 152 if verification is successful.

As shown at block 460, VMM 170 may then create the trusted view for TA 120. For instance, VMM 170 may add an EPT to EPTs 90 to serve as an EPT root structure, thereby creating the view. VMM 170 may subsequently add GPA-to-HPA page mappings to that EPT for TA code, data, TCDS, SECS, etc.

For example, as shown at block 462, VMM 170 then allocates memory for SECS 310 and then updates the EPT for TA 120 in EPTs 90 to provide access to SECS 310. As shown at block 464, VMM 170 then maps SECS 310 to the GVA which was created during registration of SECS 310 with VIDT 84. (E.g., see block 412 of FIG. 14.) The process of FIG. 15 may then end.

Figure 16:
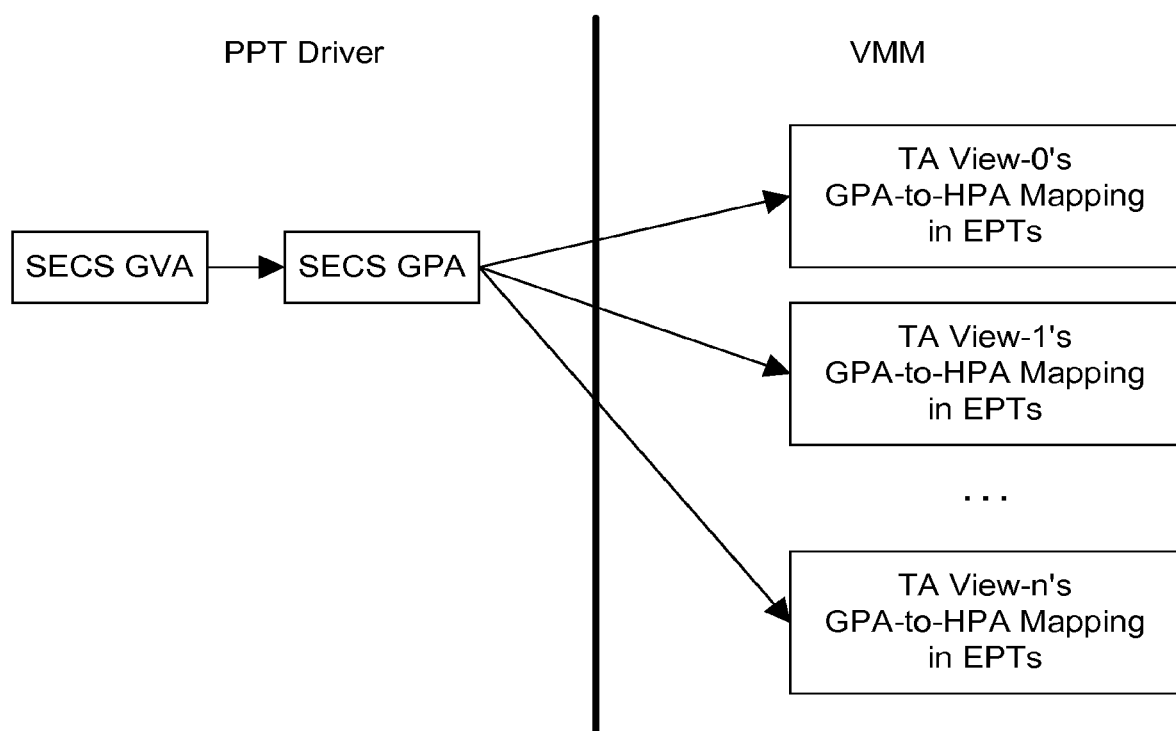
FIG. 16 is a block diagram that illustrates PPT data structure mapping according to an example embodiment.

FIG. 16 is a block diagram that illustrates PPT data structure mapping according to an example embodiment. In particular, FIG. 16 depicts a scenario in which multiple TAs have been created, and FIG. 16 illustrates that the GVA for each different SECS for each different TA points the appropriate HPA based, on the current active view. The "SECS GVA" to "SECS GPA" mapping may be done by guest OS 32. The vertical line represents the translations performed by EPTs 90. And the boxes on the right show that, if there are multiple TAs, each different TA gets a different EPT, and each different EPT maps the same SECS GPA to a different HPA.

Figure 17:
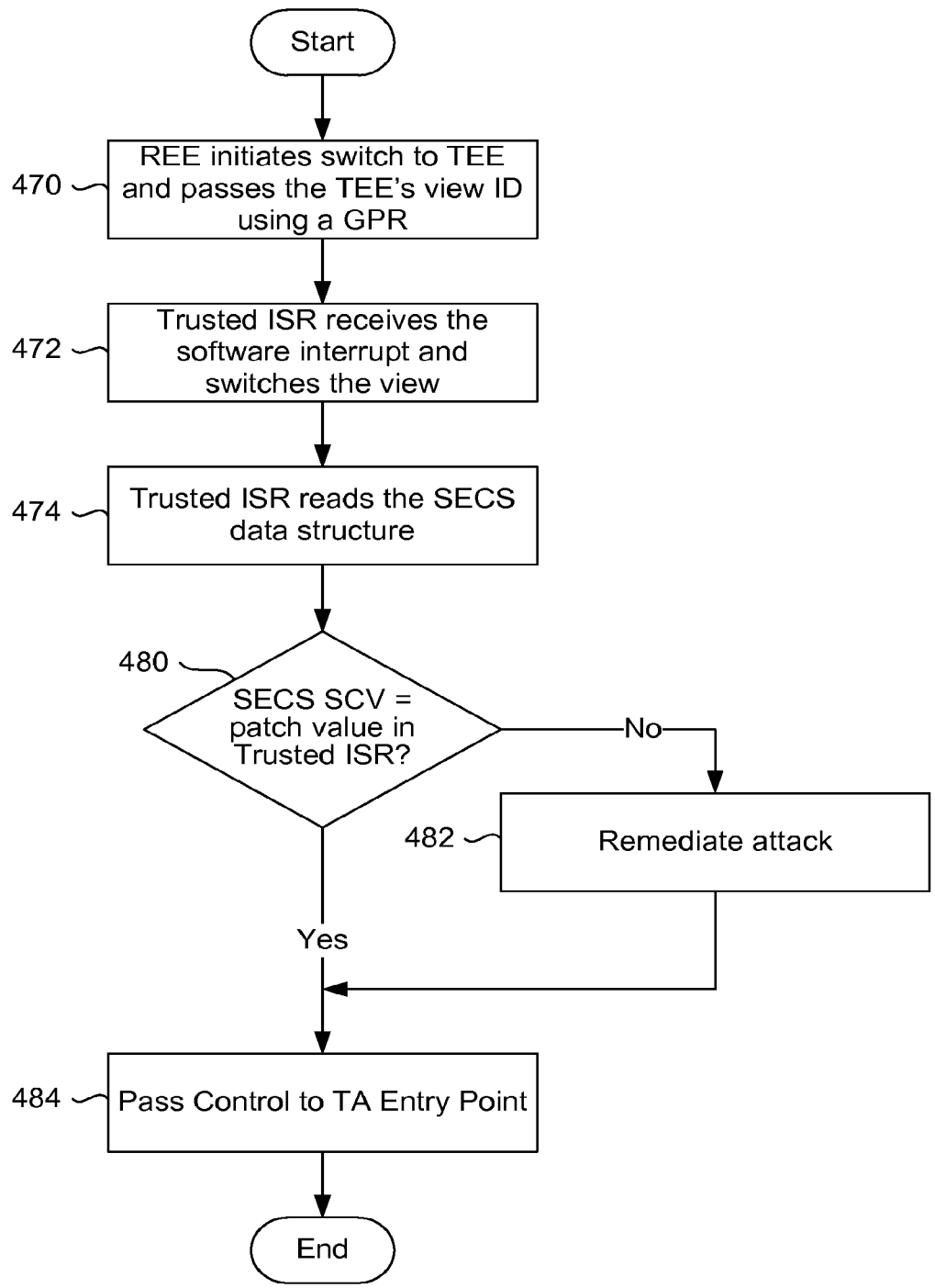
FIG. 17 is a flowchart depicting operations associated with switching from a rich execution environment to a trusted execution environment, according to an example embodiment.

FIG. 17 is a flowchart depicting operations associated with switching from a rich execution environment to a trusted execution environment, according to an example embodiment. The illustrated process starts at block 470 with a program in the REE initiating a switch to the TEE and using a GPR to pass the identifier for the view for that TEE. For instance, as described with regard to FIG. 11, untrusted application 130 may use an ecall to call TA 120, and in response the REE may trigger a TA-enter interrupt. In response, as shown at block 472, one of TISRs 152 (e.g., the TA-enter ISR) may intercept the TA-enter interrupt and, in response, switch from the untrusted view to the trusted view for TA 120.

For example, in one embodiment, the VMM maintains a pointer to the currently-active EPT on that CPU. That pointer may be a VMX data structure called the EPT-pointer or EPTP. The VMM may also maintain another data structure that contains pointers for each view's EPT. That data structure may be called the EPTP list page. The VMFUNC instruction may read the EPT list page using a specified view-id as an index to obtain the EPTP pointer for that view. The VMM may then internally update EPTP with that EPTP pointer.

As shown at block 474, after switching the view, the ISR may then read the SCV from the SECS for the current view (e.g., SECS 310). As shown at block 480, the ISR may then read the SCV from TA to be executed (e.g., TA 120), and the ISR may determine whether the patched SCV n the ISR and the SCV for TA 120 in SECS 310 match. If the SCVs do no match, the ISR may conclude that an attack is being attempted, and the ISR may take remedial action, as shown at block 482. For instance, the ISR may conclude that it has detected an invalid attempt to switch view into a trusted application view, and in response the ISR may permanently block view switching for that view handle. The ISR may also take other remedial measures. For instance, the ISR may cause a system shutdown by making a VMM assert hypercall.

However, if the SCVs match, the ISR may then pass control to the TA, as shown at block 484. The process of FIG. 17 may then end.

Part 5: Exception Handling Mechanism

As indicated above, a TA is an application that runs in an execution environment that is isolated from the REE, and the applications running in the REE cannot access the TA address space. This poses a problem for debugging runtime TA bugs from conventional debugging tools (e.g., the GNU Debugger (GDB)) that run in the REE environment.

This disclosure introduces a debugging technique that can provide information concerning TA execution state at the time of fault without crashing the process that hosts the TA. For instance, this technique may provide information from registers, including the instruction pointer (IP), from the stack, from exceptions, etc. Furthermore, this information can be shared with the corresponding REE in a secure manner, and it can be used to debug the TA and resolve the problem. As described in greater detail below, this technique uses VIDT 84 and an associated PPT exception handler (PEH).

Basically, VIDT 84 and the PEH bypass the OS exception handler if the exception (e.g., a page fault) is generated within a TA. The PEH accomplishes this by handling the exception and serving as trampoline code that switches the execution from TEE to REE. On seeing the crash status, the REE collects the information from the PEH and passes the information to the program that called the TA service, such as untrusted application 130. Untrusted application 130 may then choose to initiate the destruction of the TA. But, since TEE OS exception handler is not invoked, the hosting process is not killed. VIDT 84 and the PEH thus virtualize the interrupts and exceptions and provide a secure mechanism to switch between the TA and the REE.

As indicated above with regard to FIG. 2, VMM 170 may install VIDT 84 into guest OS 32, and VMM 170 may update a register in CRs 24 to point to VIDT 84 instead of UIDT 82. VIDT 84 may include gates for trapping interrupts or exceptions and for automatically invoking certain specified ISRs in response to those interrupts. In particular, the VIDT gate descriptors are configured to transfer control to a software handler (e.g., the PEH) that distinguishes the architectural exceptions from the other interrupt sources based on the vector number generated by the hardware on interrupt/exception. Architectural exceptions may identify faults in process execution, such as a general protection fault, a page fault, a divide-by-zero fault, etc. Other interrupt sources may include device interrupts, timer interrupts, performance monitoring interrupts, etc. The same IDT may be used to vector all interrupts. However, for purpose of exception handling, the PEH may process only the architectural exceptions, based on the vector that caused the jump in the asynchronous exit TISR.

If the exception is generated from within the TA, the PEH collects the faulting data like IP, exception type (e.g., page fault, GP fault, divide by zero, etc.), stack trace, and faulting address accessed during the fault. However, the REE exception handler is not invoked. Instead, control is directly transferred back to the process that called the TA by exiting the TA. In addition, a "TA-crashed" status is returned in a pre-defined GPR to the process that called the TA entry point. The PEH also sets an "invalid-state" flag in the SECS for that TA, so that further entry in the TA may be avoided.

As indicated above, a TA is created within the address space of the calling process, and the VMM remaps the calling process to EPTs during the creation of the view for the TA. The calling process cannot directly access the mapped EPT memory for the TA because that memory is isolated from the calling process. However, the calling process can enter the TA's view by using technology such as the VMFUNC instruction described above.

As indicated above, PPT uses custom ISRs for reserved interrupts such as TA-enter, TA-resume, and TA-exit, to manage the transitions between untrusted application and TA. As part of the process for switching the view securely, the ISR creates an isolated stack for the TA, fills in the required parameters for TA, and then jumps to the TA entry point.

Figure 18:
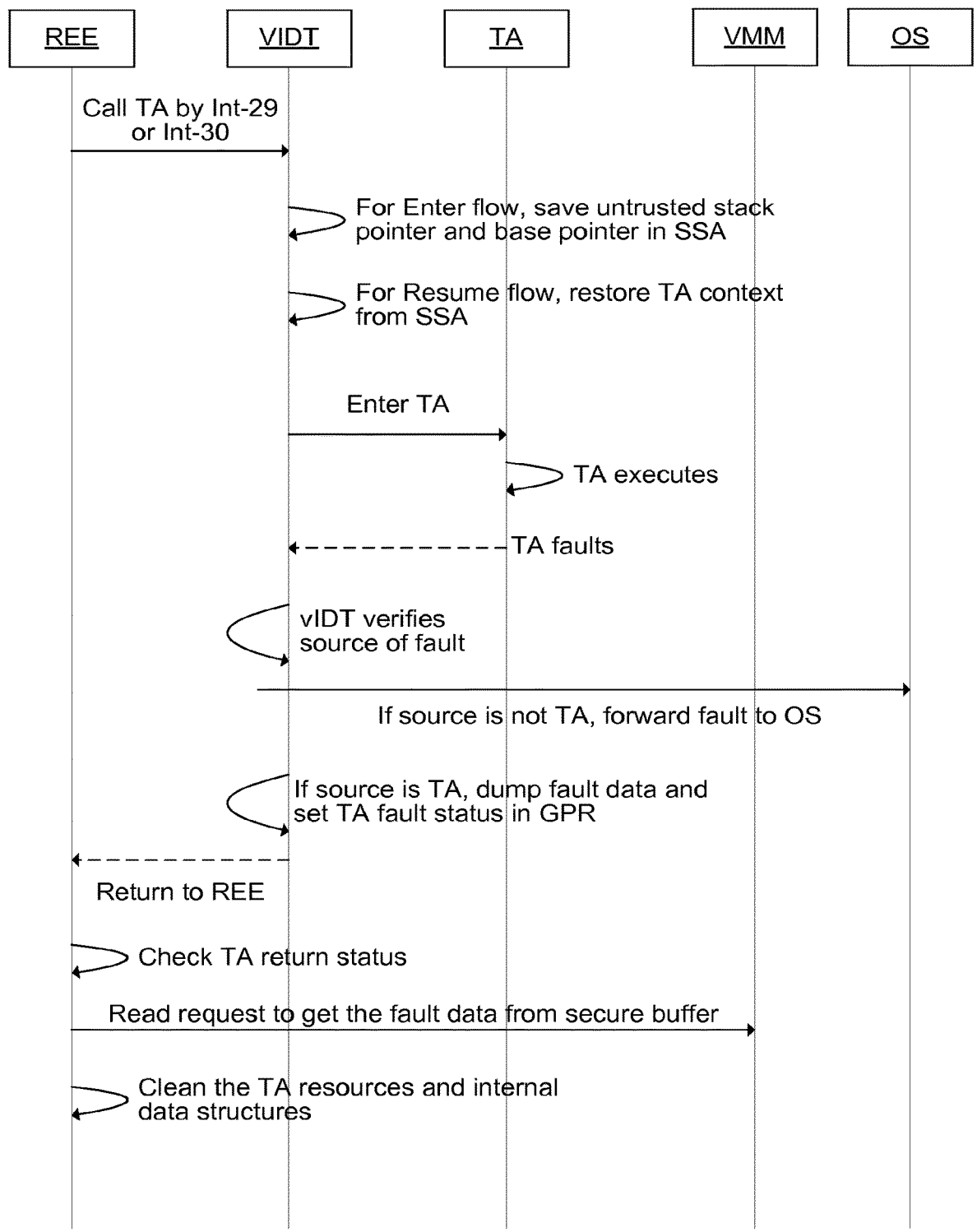
FIG. 18 is a flow diagram illustrating a process to support debugging, in according with an example embodiment.

FIG. 18 is a flow diagram illustrating a process to support debugging, in according with an example embodiment. In the illustrated process, software in the REE (e.g., untrusted application 130) calls a TA (e.g., TA 120), which causes the REE to trigger a TA-enter interrupt (e.g., Int-29), as described above. Alternatively, the TA may have been interrupted by an asynchronous event, and the flow of FIG. 18 may start with control returning to the TA via a TA-resume interrupt (e.g., Int-30).

As shown in FIG. 18, for the "Enter flow," the TA-enter ISR saves the untrusted stack pointer and untrusted base pointer in the SSA, which is part of the TCDS. For the "Resume flow," the TA-resume ISR restores TA context (e.g., the state of the GPRs, the IP, the trusted stack pointer) from the SSA. As indicated above, this TA context will have been saved by the asynchronous exit TISR, which will have been invoked earlier, for instance when a guest interrupt hit while the TA was executing.

Control is then passed to the TA, and then the TA then executes. The TA may then experience an exception, an interrupt, or some other fault (e.g., of the code has a bug). If the TA faults, in response, the PEH identifies the source of the fault. For instance, the PEH may differentiate whether the fault was generated by the TA or outside the TEE, based on the current state of the execution context. If the source is not the TA, PEH forwards the fault to the UIDT to be processed by the OS.

However, if the source is the TA, the PEH handles the exception or fault and collects data pertaining to the fault, such as IP, stack trace, and memory address accessed during the fault. In addition, the PEH records the fault status in the SECS for the TA. As indicated above, the processing element also sets a "TA-crashed" status in a pre-defined GPR. enter the TA after fault. Data processing system 20 may subsequently prevent further entry into the TA, based on the fault status in the SECS and/or the TA-crashed flag.

In addition, the PEH creates a secure buffer to share the data dump for the fault with the REE. In particular, the VMM creates this dump buffer during the creation of the TA view, and the VMM assigns this dump buffer in the SECS of the TA. For instance, the VMM may save a reference or pointer to the dump buffer in the SECS. This dump buffer can be accessed by the PEH in ring 0 when the PEH is executing under the TA context. Also, if the fault happened within the TA, the PEH traces through the TA stack and dumps the stack trace along with the IP address that caused the fault, the type of the exception, etc. into the dump buffer.

The PEH then shares the dump buffer with the REE by simply exiting the TA view. The REE can then read the TA crash status from the GPR, and the REE may choose to clean the TA view. For instance, the REE may invoke a destroy-view hypercall to instruct the VM to clean up the view.

However, before cleaning the faulted TA memory, the REE can read the dump buffer from VMM 170. Based on the dump buffer, the REE can then identify the TA stack, the IP, etc., to debug and resolve the issue.

In one embodiment, the VMM simply copies the data over to an untrusted buffer. In another embodiment, the VMM encrypts the data from the dump buffer before sharing it with the REE, and the REE then decrypt the data.

In addition, the data processing system may execute a secure boot process that provides for a TEE debug policy based on hardware and/or firmware debug tokens. An administrator may configure certain features through these tokens to provision them on the device. After that, on boot, the security engine firmware 184 may read these token values from static RAM (SRAM) or some other secure tamper-proof memory and enable or disable the TEE debug policy based on the tokens.

Alternatively, the ability to install a TEE debug token may be limited to the manufacturer of the data processing system, such as an original equipment manufacturer (OEM), and/or the manufacturer of the CPU. And only if the TEE debug token is installed would the VMM enable the TEE debug features.

PPT thus enables powerful debugging in an isolated TEE, without requiring any specialized software tools or hardware to debug the TAs.

Part 6: Conclusion

As has been described, a data processing system may use PPT to protect some or all of the code and data belonging to certain software modules from user-level (e.g., ring-3) malware and from kernel-level (e.g., ring-0) malware. PPT may provide isolation between various trusted entities, along with the ability to allocate, free, and reuse the memory dynamically at runtime. In addition, the PPT memory sharing model may allow memory sharing between TAs and the untrusted OS, in addition to between TAs.

In light of the principles and example embodiments described and illustrated herein, it will be recognized that the illustrated embodiments can be modified in arrangement and detail without departing from such principles. Also, the foregoing discussion has focused on particular embodiments, but other configurations are contemplated. Also, even though expressions such as "an embodiment," "one embodiment," "another embodiment," or the like are used herein, these phrases are meant to generally reference embodiment possibilities, and are not intended to limit the invention to particular embodiment configurations. As used herein, these phrases may reference the same embodiment or different embodiments, and those embodiments are combinable into other embodiments.

For instance, in one embodiment, the binary translators may use the same Tag-U value (e.g., 0x03) for all internal transfer destinations within the unmanaged code and for all transfers within the unmanaged code to those destinations. In another embodiment, the binary translators may use the same Tag-U value at the entry point for all defined functions, and for the calls to those functions, while using one or more different Tag-U values for other types of destinations.

Any suitable operating environment and programming language (or combination of operating environments and programming languages) may be used to implement components described herein. The present teachings may also be used to advantage in many different kinds of data processing systems. Example data processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices such as audio devices, video devices, audio/video devices (e.g., televisions and set top boxes), vehicular processing systems, and other devices for processing or transmitting information. Accordingly, unless explicitly specified otherwise or required by the context, references to any particular type of data processing system (e.g., a mobile device) should be understood as encompassing other types of data processing systems, as well. Also, unless expressly specified otherwise, components that are described as being coupled to each other, in communication with each other, responsive to each other, or the like need not be in continuous communication with each other and need not be directly coupled to each other. Likewise, when one component is described as receiving data from or sending data to another component, that data may be sent or received through one or more intermediate components, unless expressly specified otherwise. In addition, some components of the data processing system may be implemented as adapter cards with interfaces (e.g., a connector) for communicating with a bus. Alternatively, devices or components may be implemented as embedded controllers, using components such as programmable or non-programmable logic devices or arrays, application-specific integrated circuits (ASICs), embedded computers, smart cards, and the like. For purposes of this disclosure, the term "bus" includes pathways that may be shared by more than two devices, as well as point-to-point pathways.

This disclosure may refer to instructions, functions, procedures, data structures, application programs, microcode, configuration settings, and other kinds of data. As described above, when the data is accessed by a machine or device, the machine or device may respond by performing tasks, defining abstract data types or low-level hardware contexts, and/or performing other operations. For instance, data storage, RAM, and/or flash memory may include various sets of instructions which, when executed, perform various operations. Such sets of instructions may be referred to in general as software. In addition, the term "program" may be used in general to cover a broad range of software constructs, including applications, routines, modules, drivers, subprograms, processes, and other types of software components. Also, applications and/or other data that are described above as residing on a particular device in one example embodiment may, in other embodiments, reside on one or more other devices. And computing operations that are described above as being performed on one particular device in one example embodiment may, in other embodiments, be executed by one or more other devices.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing the functionality described and illustrated herein. For example, alternative embodiments include machine accessible media encoding instructions or control logic for performing the operations of the invention. Such embodiments may also be referred to as program products. Such machine accessible media may include, without limitation, tangible storage media such as magnetic disks, optical disks, RAM, ROM, etc., as well as processors, controllers, and other components that include RAM, ROM, and/or other storage facilities. For purposes of this disclosure, the term "ROM" may be used in general to refer to non-volatile memory devices such as erasable programmable ROM (EPROM), electrically erasable programmable ROM (EEPROM), flash ROM, flash memory, etc. In some embodiments, some or all of the control logic for implementing the described operations may be implemented in hardware logic (e.g., as part of an integrated circuit chip, a programmable gate array (PGA), an ASIC, etc.). In at least one embodiment, the instructions for all components may be stored in one non-transitory machine accessible medium. In at least one other embodiment, two or more non-transitory machine accessible media may be used for storing the instructions for the components. For instance, instructions for one component may be stored in one medium, and instructions another component may be stored in another medium. Alternatively, a portion of the instructions for one component may be stored in one medium, and the rest of the instructions for that component (as well instructions for other components), may be stored in one or more other media. Instructions may also be used in a distributed environment, and may be stored locally and/or remotely for access by single or multi-processor machines.

Also, although one or more example processes have been described with regard to particular operations performed in a particular sequence, numerous modifications could be applied to those processes to derive numerous alternative embodiments of the present invention. For example, alternative embodiments may include processes that use fewer than all of the disclosed operations, process that use additional operations, and processes in which the individual operations disclosed herein are combined, subdivided, rearranged, or otherwise altered.

In view of the wide variety of useful permutations that may be readily derived from the example embodiments described herein, this detailed description is intended to be illustrative only, and should not be taken as limiting the scope of coverage.

The following examples pertain to further embodiments.

Example A1 is one or more tangible computer-readable media storing non-transitory computer-executable instructions that, when executed by a processor of a device, implement a virtual machine monitor (VMM) to enable an untrusted application and a trusted application to run on top of a single operating system (OS), while preventing the untrusted application from accessing memory used by the trusted application. The VMM may accomplish this by using a first extended page table (EPT) to translate a guest physical address (GPA) into a first host physical address (HPA) for the untrusted application, and using a second EPT to translate the GPA into a second HPA for the trusted application. The first and second EPTs map the same GPA to different HPAs.

Example A2 is a computer-readable medium according to Example A1, wherein the VMM enables the OS, the untrusted application, and the trusted application to execute in a single virtual machine (VM).

Example A3 is a computer-readable medium according to Example A1, wherein the OS uses a guest page table to translate guest virtual addresses (GVAs) into GPAs for the untrusted application and for the trusted application. Example A3 may also include the features of Example A2.

Example A4 is a computer-readable medium according to Example A1, wherein the instructions, when executed, also implement an interrupt service routine (ISR) that enables the untrusted application to transfer control to the trusted application.

Example A4 may also include the features of any one or more of Examples A2 and A3.

Example A5 is a computer-readable medium according to Example A5, wherein the instructions in the machine-accessible medium, when executed, also implement a platform protection technology (PPT) driver to install the ISR. Example A5 may also include the features of any one or more of Examples A2 and A3.

Example A6 is a computer-readable medium according to Example A1, wherein the VMM comprises a data structure that associates different view identifiers with different EPTs. Example A6 may also include the features of any one or more of Examples A2 through A5.

Example A7 is a computer-readable medium according to Example A6, wherein the VMM comprises an EPT pointer that points to the EPT for the view that is currently active. Example A7 may also include the features of any one or more of Examples A2 through A5.

Example B1 is a computer-readable medium according to Example A1, wherein the instructions, when executed, implement platform protection technology (PPT) to (a) load the trusted application to execute on top of the OS, wherein the OS uses a guest page table (GPT) to translate guest virtual addresses (GVAs) into a guest physical addresses (GPAs); (b) create an asserted page table (APT) for the trusted application, the APT to translate GVAs into GPAs for the trusted application; (c) prevent the OS from modifying the APT; (d) configure the processor of the device to use the APT instead of the GPT; and (e) after configuring the processor to use the APT instead of the GPT, execute the trusted application. Example A8 may also include the features of any one or more of Examples A2 through A7.

Example C1 is a computer-readable medium according to Example B1, wherein the OS comprises an untrusted interrupt descriptor table (IDT) with gates that associate interrupt vectors with untrusted interrupt service routines (ISRs). Example A9 further comprises the PPT to (a) create a virtual IDT (VIDT) with gates that associate interrupt vectors with trusted ISRs, wherein the trusted ISRs comprise a TA-enter ISR that causes the device to switch from an untrusted memory view associated with the untrusted application to a trusted memory view associated with the trusted application; (b) configure the processor of the device to use the VIDT instead of the untrusted IDT (UIDT); and (c) after configuring the processor to use the VIDT instead of the UIDT, respond to a TA-enter interrupt by invoking the TA-enter ISR. Example A9 may also include the features of any one or more of Examples A2 through A7.

Example D1 is a computer-readable medium according to Example C1, further comprising the untrusted application to run on top of the OS in a virtual machine (VM) in a rich execution environment (REE), and the trusted application to run on top of the OS in the VM in a trusted execution environment (TEE) that prevents the untrusted application from accessing memory used by the trusted application. Example A10 further comprises the PPT to (a) generate a secret cookie value (SCV) for the trusted application; (b) save the SCV to a PPT data structure associated with the trusted application; (c) patch the SCV into trampoline code that provides for transferring control from the untrusted application to the trusted application; (d) in response to the untrusted application calling the trusted application, before allowing the trusted application to execute, determine whether the trampoline code and the PPT data structure contain matching SCVs; (e) allow the trusted application to execute only if the trampoline code and the PPT structure contain matching SCVs; (f) before allowing the trusted application to execute in the TEE, create a dump buffer in the TEE; (g) in response to a fault during execution of the trusted application, saving fault data from the TEE to the dump buffer; and (h) sharing the dump buffer with the REE. Example A10 may also include the features of any one or more of Examples A2 through A7.

Example E1 is one or more tangible computer-readable media storing non-transitory computer-executable instructions that, when executed by a processor of a device, implement platform protection technology (PPT) to (a) load a trusted application to execute on top of an operating system (OS) that uses a guest page table (GPT) to translate guest virtual addresses (GVAs) into a guest physical addresses (GPAs); (b) create an asserted page table (APT) for the trusted application, the APT to translate GVAs into GPAs for the trusted application; (c) prevent the OS from modifying the APT; (d) configure the processor of the device to use the APT instead of the GPT; and (e) after configuring the processor to use the APT instead of the GPT, execute the trusted application.

Example E2 is a computer-readable medium according to Example E1, wherein the GPT is not write protected.

Example E3 is a computer-readable medium according to Example E1, wherein the PPT comprises a virtual machine monitor (VMM) to create the APT, and an interrupt service routine (ISR) to configure the processor to use the APT instead of the GPT. Example E3 may also include the features of Example E2.

Example E4 is a computer-readable medium according to Example E1, wherein the PPT comprises a PPT loader to load the trusted application into memory and to register each page of the trusted application with the VMM, and wherein the VMM creates the APT in response to the PPT loader. Example E4 may also include the features of any one or more of Examples E2 through E3.

Example E5 is a computer-readable medium according to Example E4, further comprising the VMM to walk an OS page table for each TA page in response to the PPT loader registering said page with the VMM, and the VMM to replicate an OS page table entry for said page to the APT. Example E5 may also include the features of any one or more of Examples E2 through E3.

Example E6 is a computer-readable medium according to Example E3, further comprising the VMM to lock the APT, and the trusted application to execute only after the VMM has locked the APT. Example E6 may also include the features of any one or more of Examples E2 through E5.

Example F1 is one or more tangible computer-readable media storing non-transitory computer-executable instructions that, when executed by a processor of a device, implement platform protection technology (PPT) to (a) enable an untrusted application and a trusted application to run on top of a single operating system (OS), while preventing the untrusted application from accessing memory used by the trusted application, wherein the OS comprises an untrusted interrupt descriptor table (IDT) with gates that associate interrupt vectors with untrusted interrupt service routines (ISRs); (b) create a virtual IDT (VIDT) with gates that associate interrupt vectors with trusted ISRs, wherein the trusted ISRs comprise a TA-enter ISR that causes the device to switch from an untrusted memory view associated with the untrusted application to a trusted memory view associated with the trusted application; (c) configure the processor of the device to use the VIDT instead of the untrusted IDT (UIDT); and (d) after configuring the processor to use the VIDT instead of the UIDT, respond to a TA-enter interrupt by invoking the TA-enter ISR.

Example F2 is a computer-readable medium according to Example F1, further comprising the VMM to store the trusted ISRs in a trusted kernel context (TKC), wherein the VMM prevents the OS from modifying the TKC.

Example F3 is a computer-readable medium according to Example F1, wherein the trusted ISRs further comprise a TA-exit ISR that, in response to a TA-exit interrupt, causes the device to switch from the trusted memory view associated with the trusted application to the untrusted memory view associated with the untrusted application. Example F3 may also include the features of Example F2.

Example F4 is a computer-readable medium according to Example F1, wherein the trusted ISRs further comprise a TA-resume ISR that, in response to a TA-resume interrupt, causes the device to (a) switch from the untrusted memory view associated with the untrusted application to the trusted memory view associated with the untrusted application; and (b) restore context for the trusted application. Example F4 may also include the features of any one or more of Examples F2 through F3.

Example F5 is a computer-readable medium according to Example F1, wherein the trusted
ISRs further comprise a general purpose (GP) ISR to (a) in response to an interrupt, determine whether the interrupt occurred while the trusted application is executing; and (b) in response to determining that the interrupt occurred while the trusted application is executing: (i) save state data from at least one register to a save state area (SSA) for the trusted application; and (ii) replace a return instruction pointer (RIP) on a current trusted stack with an asynchronous exit pointer (AEP) of an untrusted runtime associated with the untrusted application. Example F5 may also include the features of any one or more of Examples F2 through F4.

Example F6 is a computer-readable medium according to Example F5, wherein the state data comprises the RIP from the current trusted stack. Example F6 may also include the features of any one or more of Examples F2 through F4.

Example F7 is a computer-readable medium according to Example F5, further comprising, to GP ISR to switch from a trusted page table to an untrusted page table by switching a control register to pointing to the trusted page table, and switch from the trusted memory view to untrusted memory view. Example F7 may also include the features of any one or more of Examples F2 through F6.

Example F8 is a computer-readable medium according to Example F5, further comprising, to GP ISR to (a) replace a trusted runtime stack pointer (RSP) with an untrusted RSP; and (b) after replacing the trusted RSP with the untrusted RSP, executing a interrupt return (iret) to cause control to jump to a known exit point in the untrusted runtime. Example F8 may also include the features of any one or more of Examples F2 through F7.

Example F9 is a computer-readable medium according to Example F5, further comprising, to GP ISR to: (a) prepare synthetic general purpose register (GPR) state on an interrupt stack, wherein the synthetic GPR state comprises a flag indicating that, for control to return to the trusted application, the control must come from the TA-resume ISR; (b) switch from the current trusted stack to an untrusted stack; (c) copy the synthetic GPR state to the untrusted stack; and (d) jump to an OS ISR by executing a return instruction. Example F9 may also include the features of any one or more of Examples F2 through F8.

Example G1 is one or more tangible computer-readable media storing non-transitory computer-executable instructions that, when executed by a processor of a device, implement platform protection technology (PPT) to (a) generate a secret cookie value (SCV) for a trusted application to run on top of an operating system (OS) in a virtual machine (VM); (b) save the SCV to a PPT data structure associated with the trusted application; (c) patch the SCV into trampoline code that provides for transferring control from an untrusted application to the trusted application; (d) in response to the untrusted application calling the trusted application, before allowing the trusted application to execute, determine whether the trampoline code and the PPT data structure contain matching SCVs; and (e) allow the trusted application to execute only if the trampoline code and the PPT structure contain matching SCVs.

Example G2 is a computer-readable medium according to Example G1, wherein the PPT comprises trusted interrupt service routines (ISRs); the trusted ISRs comprises a TA-enter ISR that causes the device to switch from an untrusted memory view associated with the untrusted application to a trusted memory view associated with the trusted application; and the TA-enter ISR is to perform the operation of determining whether the trampoline code and the PPT data structure contain matching SCVs.

Example G3 is a computer-readable medium according to Example G1, wherein the PPT data structure associated with the trusted application resides outside of the VM. Example G3 may also include the features of Example G2.

Example H1 is one or more tangible computer-readable media storing non-transitory computer-executable instructions that, when executed by a processor of a device, implement platform protection technology (PPT) to (a) enable an untrusted application to run on top of an operating system (OS) in a rich execution environment (REE); (b) enable a trusted application to run on top of the OS in a in a trusted execution environment (TEE) that prevents the untrusted application from accessing memory used by the trusted application; (c) before allowing the trusted application to execute in the TEE, create a dump buffer in the TEE; (d) in response to a fault during execution of the trusted application, saving fault data from the TEE to the dump buffer; and (e) sharing the dump buffer with the REE.

Example H2 is a computer-readable medium according to Example H1, wherein sharing the dump buffer with the REE comprises copying the dump buffer to untrusted memory.

What is claimed is:

1. A method comprising:
   enabling, by a data processing system, an untrusted application and a trusted application to run on top of a single operating system (OS), while preventing the untrusted application from accessing memory used by the trusted application, wherein the OS comprises an untrusted interrupt descriptor table (IDT) with gates that associate interrupt vectors with untrusted interrupt service routines (ISRs);
   creating, by the data processing system, a virtual IDT (VIDT) with gates that associate interrupt vectors with trusted ISRs, wherein the trusted ISRs comprise a trusted application (TA)-enter ISR that causes the data processing system to switch from an untrusted memory view associated with the untrusted application to a trusted memory view associated with the trusted application;
   configuring, by the data processing system, a processor of the data processing system to use the VIDT instead of the untrusted IDT (UIDT); and
   responding, by the data processing system and after configuring the processor, to a TA-enter interrupt by invoking the TA-enter ISR.

2. The method of claim 1, further comprising:
   storing, by a virtual machine monitor (VMM) of the data processing system, the trusted ISRs in a trusted kernel context (TKC); and preventing, by the VMM, the OS from modifying the TKC.

3. The method of claim 1, wherein the trusted ISRs further comprise a TA-exit ISR, and further comprising:
  switching, by the TA-exit ISR and in response to a TA-exit interrupt, from the trusted memory view associated with the trusted application to the untrusted memory view associated with the untrusted application.

4. The method of claim 1, wherein the trusted ISRs further comprise a TA-resume ISR, and further comprising:
  in response to a TA-resume interrupt, (i) switching, by the TA-resume ISR, from the untrusted memory view associated with the untrusted application to the trusted memory view associated with the untrusted application and (ii) restoring, by the TA-resume ISR, context for the trusted application.

5. The method of claim 1, wherein the trusted ISRs further comprise a general purpose (GP) ISR, and further comprising:
  determining, by the GP ISR and in response to an interrupt, whether the interrupt occurred while the trusted application is executing; and
  in response to determining that the interrupt occurred while the trusted application is executing:
    saving, by the GP ISR, state data from at least one register to a save state area (SSA) for the trusted application; and
    replacing, by the GP ISR, a return instruction pointer (RIP) on a current trusted stack with an asynchronous exit pointer (AEP) of an untrusted runtime associated with the untrusted application.

6. A data processing system comprising:
  one or more processors; and
  one or more memory devices having stored therein a plurality of instructions that, when executed by the one or more processors, causes the data processing system to:
  enable an untrusted application and a trusted application to run on top of a single operating system (OS), while preventing the untrusted application from accessing memory used by the trusted application, wherein the OS comprises an untrusted interrupt descriptor table (IDT) with gates that associate interrupt vectors with untrusted interrupt service routines (ISRs);
  create a virtual IDT (VIDT) with gates that associate interrupt vectors with trusted ISRs, wherein the trusted ISRs comprise a trusted application (TA)-enter ISR that causes the data processing system to switch from an untrusted memory view associated with the untrusted application to a trusted memory view associated with the trusted application;
  configure a processor of the one or more processors to use the VIDT instead of the untrusted IDT (UIDT); and
  respond, after configuring the processor, to a TA-enter interrupt by invoking the TA-enter ISR.

7. The data processing system of claim 6, wherein the plurality of instructions, when executed, further cause the data processing system to:
  store, by a virtual machine monitor (VMM) of the data processing system, the trusted ISRs in a trusted kernel context (TKC); and
  prevent, by the VMM, the OS from modifying the TKC.

8. The data processing system of claim 6, wherein the trusted ISRs further comprise a TA-exit ISR, and wherein the plurality of instructions, when executed, further cause the data processing system to:
  switch, by the TA-exit ISR and in response to a TA-exit interrupt, from the trusted memory view associated with the trusted application to the untrusted memory view associated with the untrusted application.

9. The data processing system of claim 6, wherein the trusted ISRs further comprise a TA-resume ISR, and wherein the plurality of instructions, when executed, further cause the data processing system to:
  in response to a TA-resume interrupt, (i) switch, by the TA-resume ISR, from the untrusted memory view associated with the untrusted application to the trusted memory view associated with the untrusted application and (ii) restore, by the TA-resume ISR, context for the trusted application.

10. The data processing system of claim 6, wherein the trusted ISRs further comprise a general purpose (GP) ISR, and wherein the plurality of instructions, when executed, further cause the data processing system to:
  determine, by the GP ISR and in response to an interrupt, whether the interrupt occurred while the trusted application is executing; and
  in response to determination that the interrupt occurred while the trusted application is executing:
    save, by the GP ISR, state data from at least one register to a save state area (SSA) for the trusted application; and
    replace, by the GP ISR, a return instruction pointer (RIP) on a current trusted stack with an asynchronous exit pointer (AEP) of an untrusted runtime associated with the untrusted application.

11. An apparatus comprising:
  one or more processors coupled to memory, the one or more processors to:
  enable an untrusted application and a trusted application to run on top of a single operating system (OS), while preventing the untrusted application from accessing memory used by the trusted application, wherein the OS comprises an untrusted interrupt descriptor table (IDT) with gates that associate interrupt vectors with untrusted interrupt service routines (ISRs);
  create a virtual IDT (VIDT) with gates that associate interrupt vectors with trusted ISRs, wherein the trusted ISRs comprise a trusted application (TA)-enter ISR that causes the data processing system to switch from an untrusted memory view associated with the untrusted application to a trusted memory view associated with the trusted application;
  configure a processor of the one or more processors to use the VIDT instead of the untrusted IDT (UIDT); and
  respond, after configuring the processor, to a TA-enter interrupt by invoking the TA-enter ISR.

12. The apparatus of claim 11, wherein the plurality of instructions, when executed, further cause the data processing system to:
  store, by a virtual machine monitor (VMM), the trusted ISRs in a trusted kernel context (TKC); and
  prevent, by the VMM, the OS from modifying the TKC.

13. The apparatus of claim 11, wherein the trusted ISRs further comprise a TA-exit ISR, and wherein the one or more processors are further to:
  switch, by the TA-exit ISR and in response to a TA-exit interrupt, from the trusted memory view associated with the trusted application to the untrusted memory view associated with the untrusted application.

14. The apparatus of claim 11, wherein the trusted ISRs further comprise a TA-resume ISR, and wherein the one or more processors are further to:

in response to a TA-resume interrupt, (i) switch, by the TA-resume ISR, from the untrusted memory view associated with the untrusted application to the trusted memory view associated with the untrusted application and (ii) restore, by the TA-resume ISR, context for the trusted application.

15. The apparatus of claim 11, wherein the trusted ISRs further comprise a general purpose (GP) ISR, and wherein the one or more processors are further to:
  determine, by the GP ISR and in response to an interrupt, whether the interrupt occurred while the trusted application is executing; and
  in response to determination that the interrupt occurred while the trusted application is executing:
    save, by the GP ISR, state data from at least one register to a save state area (SSA) for the trusted application; and
    replace, by the GP ISR, a return instruction pointer (RIP) on a current trusted stack with an asynchronous exit pointer (AEP) of an untrusted runtime associated with the untrusted application.

\* \* \* \* \*